United States Patent [19]
van der Kolk et al.

[11] 3,927,528
[45] Dec. 23, 1975

[54] CONTROL SYSTEM FOR INTERNAL COMBUSTION ENGINE AND VARIABLE TRANSMISSION POWER TRAIN

[75] Inventors: Hans-Jürgen van der Kolk, Sersheim; Reinhard Mindner, Gutenberg; Tilman Kiess, Stuttgart; Peter Mühlich, Esslingen; Ulrich Aldinger, Stuttgart, all of Germany; Karl-Heinz Adler, Maisons-Laffitte, France

[73] Assignee: Robert Bosch G.m.b.H., Gerlingen-Schillerhoehe, Germany

[22] Filed: Aug. 14, 1974

[21] Appl. No.: 497,361

[30] Foreign Application Priority Data
Aug. 13, 1973 Germany............................ 2340841

[52] U.S. Cl. .................. 60/431; 74/859; 74/865; 74/861
[51] Int. Cl.² ............... F16D 31/02; F02D 11/10; G05G 21/00; B60K 41/18
[58] Field of Search ............ 74/857, 859, 860, 861, 74/865, 866, 870, 876, 877; 60/431, 434, 445, 449

[56] References Cited
UNITED STATES PATENTS

| | | | |
|---|---|---|---|
| 3,300,000 | 1/1967 | Stoyke | 74/857 X |
| 3,324,740 | 6/1967 | Lewis et al. | 74/866 |
| 3,371,479 | 3/1968 | Yapp et al. | 60/431 |
| 3,665,787 | 5/1972 | Wilkinson | 74/857 X |
| 3,709,069 | 1/1973 | Hagen | 74/866 X |
| 3,741,042 | 6/1973 | Ravenel | 74/866 X |
| 3,763,720 | 10/1973 | Arno et al. | 74/857 |
| 3,805,676 | 4/1974 | Hamma et al. | 74/865 X |

Primary Examiner—Benjamin W. Wyche
Assistant Examiner—Lance W. Chandler
Attorney, Agent, or Firm—Flynn & Frishauf

[57] ABSTRACT

The power transfer of power developed in an internal combustion engine, connected to a variable ratio transmission and more particularly to a hydraulic transmission including a hydraulic pump, or compressor, in a hydraulic circuit with a hydraulic motor, is controlled by obtaining signals representative of engine controller position, engine output torque (that is, transmission input torque), transmission output torque, engine speed, and effective ratio of speed (or torque) transmitted by the transmission from the engine to the transmission output. A control unit accepts all the foregoing parameters, and logically combines the parameters to provide an output to control the transmission ratio, and flow of hydraulic fluid in the hydraulic transmission, for example by appropriate setting of the swash, or wobble plate of swash plate hydraulic engines in accordance with characteristic transfer functions of the sensed parameters with respect to signals as actually derived and representative of the sensed parameters.

37 Claims, 18 Drawing Figures

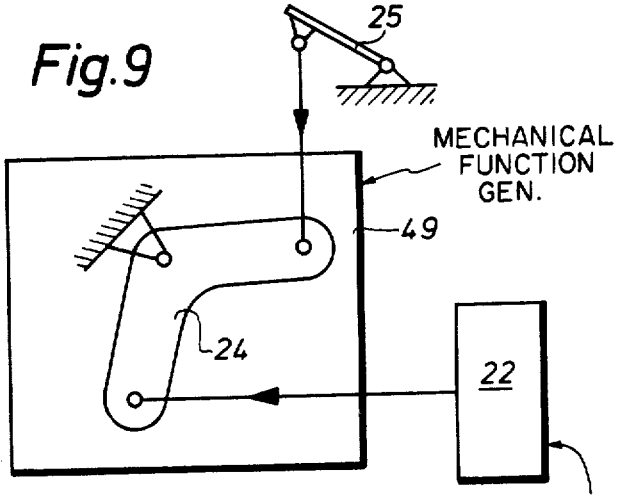
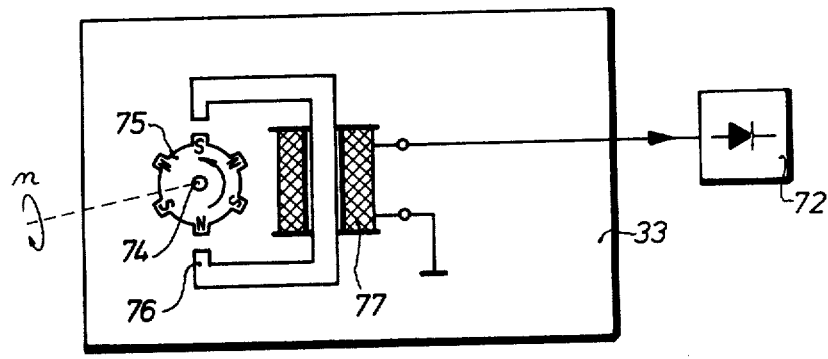
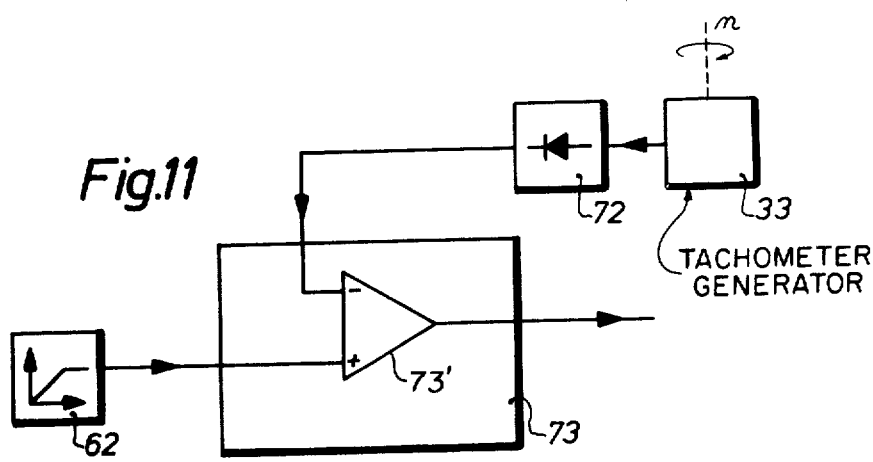

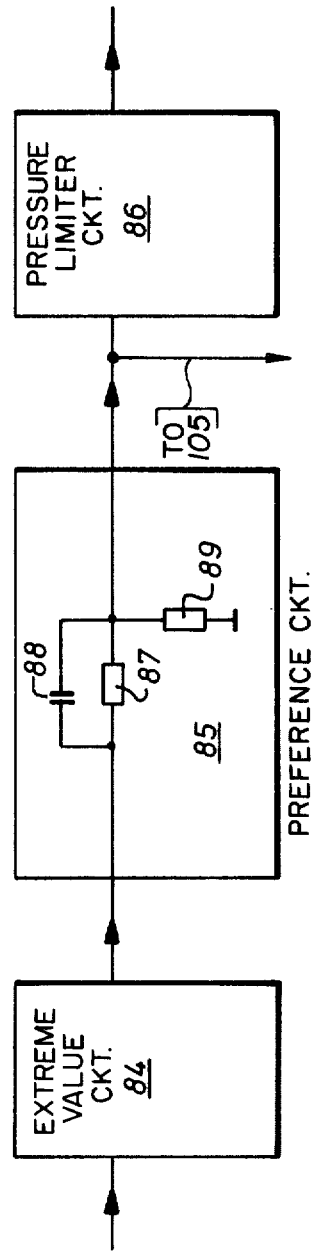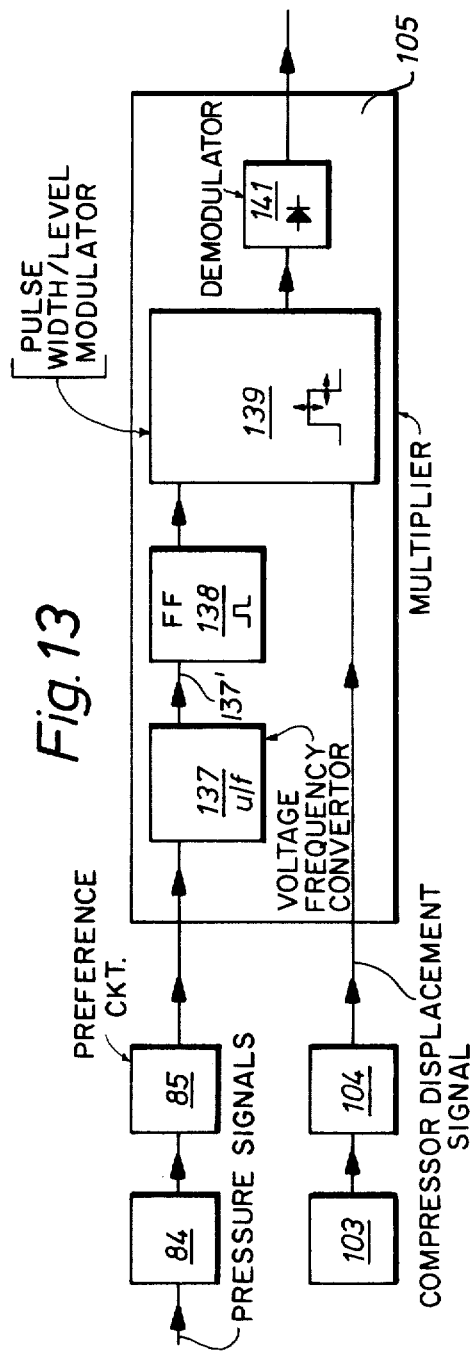

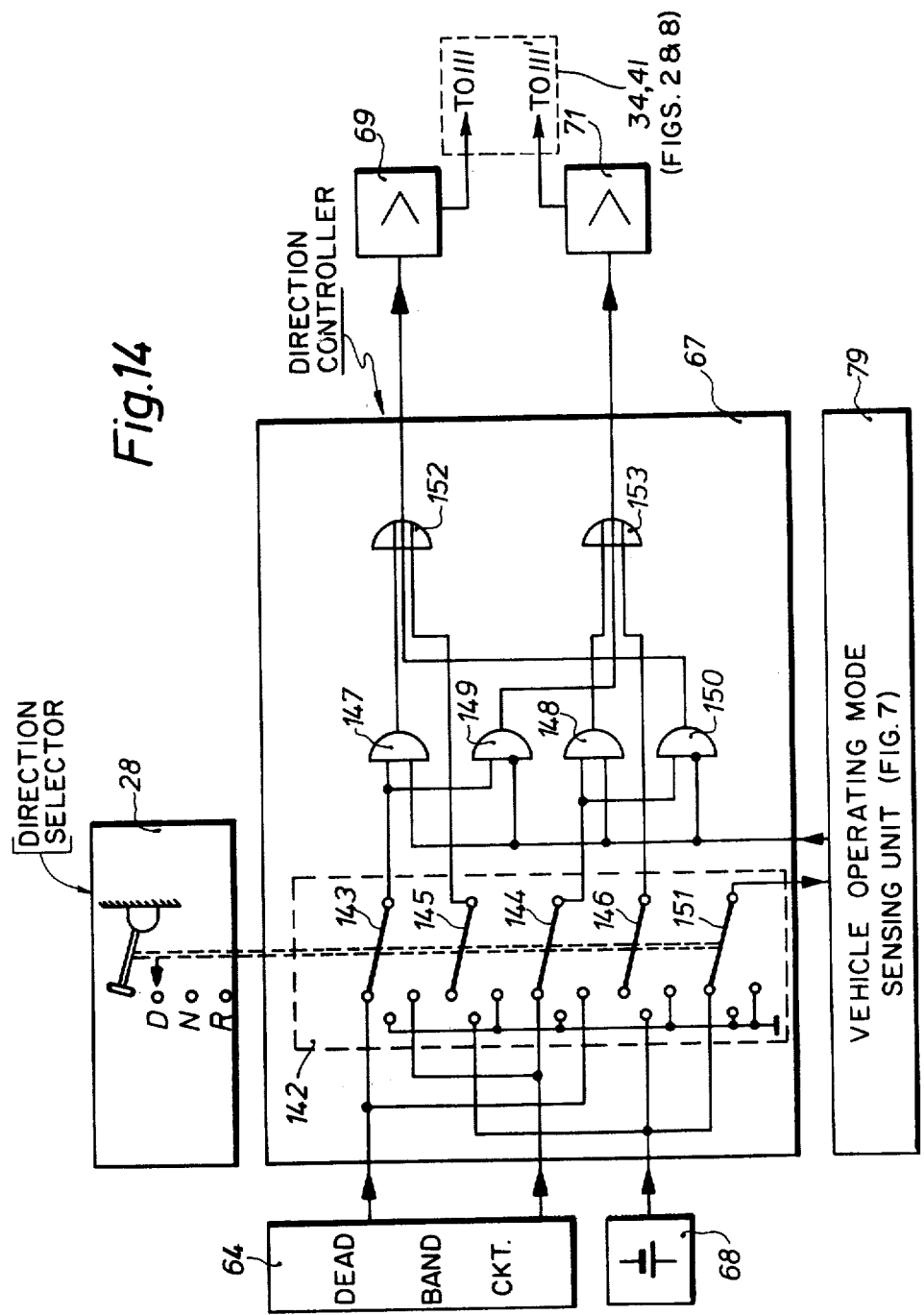

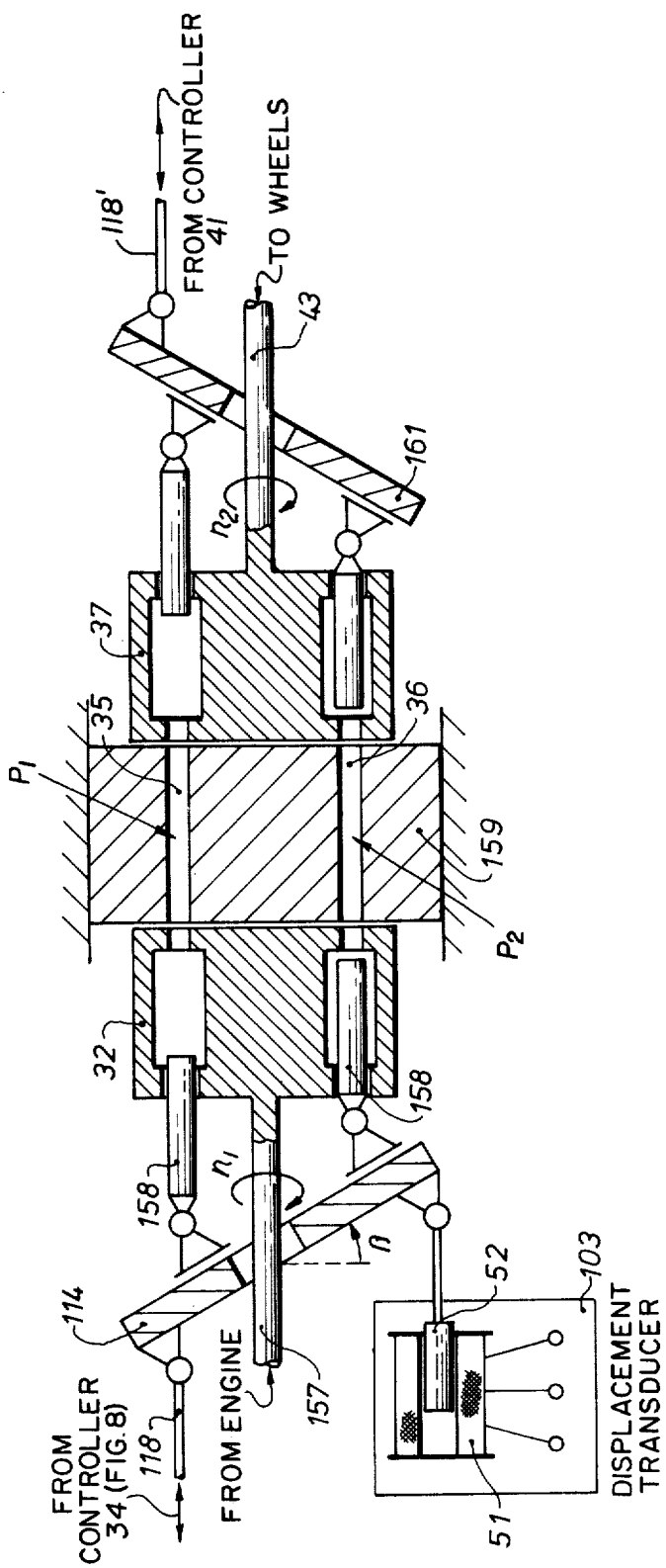

CONTROL SYSTEM FOR INTERNAL COMBUSTION ENGINE AND VARIABLE TRANSMISSION POWER TRAIN

The present invention relates to a control system for an internal combustion engine, and more particularly to a control system for Diesel engines intended to drive a load through a variable ratio transmission. Diesel motors are frequently used in combination with variable transmission ratio connection links, or drive trains, which include, for example, a hydrostatic drive having a hydraulic displacement pump and a hydraulic displacement motor, and further including transmission ducts for the hydraulic pressure fluid. The invention is generally directed to the control system which includes electro-hydraulic control elements, in order to control the operating characteristics of the displacement pump and the displacement motor, the Diesel engine itself being controlled by an injection pump to inject fuel, under pressure, to the Diesel motor. The Diesel motor-fluid pump-fluid motor combination may, for example, be utilized for heavy vehicle application, trucks, tractors, buses, road equipment, and construction equipment which includes, additionally to the drive for the wheels, power take-off devices for lifting, or other operating uses. The control system is particularly used to process data representative of operating parameters of the Diesel motor, and of the hydraulic drive combination (pump and motor), the data being processed in accordance with characteristics relating the performance of the various elements in the Diesel motor - hydraulic transmission system to obtain an overall operation characteristic of the drive system which operates with optimum performance at given, desired, output characteristics.

It has previously been proposed to select switching time, or switching instants and characteristics of variable speed transmissions in accordance with operating conditions of the vehicle, taking into consideration calculated characteristics relating the operating characteristics of the engine to performance thereof. Automatically switching transmission devices, as proposed, include for example a torque converter, a transmission unit and clutches for selective engagement of gear transmissions of the transmission unit. Automatic switching of the gears, to change the transmission ratio of the gear unit, for example by selective operation of clutches, is obtained under control of signal transducers which respond to torque of the motor or, selectively, to position of the throttle controlling the motor; the signals are applied to an electronic controller which evaluates the signals received from the transducers and so changes the switching time that a previously calculated, optimum switching time is obtained depending on the operating conditions to which the motor is subjected at any instant of time. Such an arrangement, as proposed, is not responsive to many operating parameters which should additionally be considered to effect optimum control of the drive system including the internal combustion engine. Modern engine-variable transmission combinations require better matching of operating performance to operating conditions.

A device has been proposed to automatically switch geared transmission units used in vehicles in which a central control system is provided which responds to command signals representative of speed of the engine, and output speed of the gear, and, upon evaluation of respective values, controls the gear change. The gear boxes themselves are usually synchromesh gears, so that gear shifting occurs at synchronous operation of the various gears, a synchronizing switching arrangement providing control signals upon over, or under-synchronous operation of shaft in the gear box, the central control unit effecting operation of clutches between the motor and the gear box as, required. Such an arrangement permits rapid switching of fixed gearing in gear boxes even if several limiting conditions are to be evaluated. The requirements placed on the electronic circuitry are high, and a high number of electronically operated switching devices are necessary. Such an arrangement is, therefore, suitably only in limited applications.

An electronic control system for automatic gear transmission apparatus in motor vehicles has also been proposed in which a sensor is provided to sense vehicle speed, a further sensor senses motor torque, and the neutral interval is changed, upon down-shifting, in dependence on speed, and torque, as sensed. Such an arrangement only solves a portion of the problem which is common to all control systems for motor vehicles; it does not provide a complete control system.

It is an object of the present invention to provide a control system for internal combustion engines, and more particularly a control system for Diesel motors, in which a large number of operating parameters of the motor, and of the transmission can be evaluated, which is economical, and which provides for economical operation and control under optimum conditions of operation of the power transmitting and generating elements of the entire system, while being able to consider loading on the motor, as well as the transmission change ratios of the transmission itself.

SUBJECT MATTER OF THE PRESENT INVENTION

Briefly, the operator controller, typically an accelerator pedal controls a transducer; a torque transducer, coupled to the variable drive (for example the hydraulic compressor pump and the displacement motor) provides a signal representative of the input torque to the transmission and a further transducer provides a signal representative of the output torque of the transmission. A speed transducer, or tachometer, provides a signal representative of the input speed to the compressor, or transmission. The compressor, further, is connected to a transducer providing a signal representative of displacement volume of hydraulic fluid. The various signals from the various transducers are applied to a controller which provides an output signal to control the injection pump apparatus for the Diesel engine and/or the transmission ratio of the variable transmission drive, formed of the displacement pump, or compressor and the hydraulic displacement motor. The controller, or elements interposed in the connection lines between the transducers and the controller may be non-linear, or have non-linear transfer characteristics so that the transduced signal-output characteristics derived from the controller can be matched to the operating characteristics of the Diesel engine and the associated variable speed drive.

The control system permits simplifications, and improved operating characteristics. For example, it permits matching of the output torque of the combined motor - variable speed drive to be essentially proportional to the position of the control pedal. It is also possible to so arrange the controller that, depending on output torque and the output speed of the combined motor - variable speed drive, torque and speed of the driving Diesel engines can be so controlled that the fuel consumption of the overall drive system, or drive train is a minimum.

The present invention permits use of components which can be made in mass production, or as standard articles; magnetic valves, inductive, or other displacement transducers, tachometer generators, and the like are readily available. Some signals which are used in the system may already be available from transducers, or control apparatus which are already associated with the engine system; for example, electronically controlled fuel injection systems have signals appear thereat, derived from associated transducers, which can be used in the system of the present invention, for combined control of the internal combustion engine and the variable speed transmission connected thereto. Limiting values can readily be programmed; for example, the upper limiting value for hydraulic pressure in the compressor - displacement motor arrangement, as well as upper limits for input torque to the drive can be set. Upon operation of the system, that limiting value which is first reached is then used to control the displacement volume of the compressor, and is then determinative of the output speed of the combined motor - transmission system. The upper limiting value of the pressure in the system will provide safe limits, with minimum losses in the entire system. The permissible upper limiting values are adjustable.

It is important to sense the operating conditions to which drive systems or drive trains are subjected in order to effect appropriate control. In particular, it is important to determine if the engine is supplying power to move the vehicle, or if the vehicle is coasting or, itself, is being pushed or, for example running downhill. Transducers are provided, in accordance with a feature of the present invention, and associated with the pressure side and the suction side of the hydrostatic transmission system, the signals so obtained being connected to switch over the control unit, and to block the transmission ratio change when the vehicle is operating in coasting, or non-power mode.

The torque output of the internal combustion engine, in accordance with a feature of the invention, is obtained by calculation; a position transducer provides a signal representative of the position of the fuel injection control element, typically the injection pump control rod; a signal representative of the engine internal friction component is derived, as well as a signal representative of the Diesel engine acceleration torque. These signals are combined, logically, to obtain, simply, the output torque of the Diesel engine. In accordance with a feature of the invention, the Diesel engine output torque can be obtained from signals representative of pressure and flow rate, or displacement rate of a hydrostatic fluid transmission system, including a displacement pump, or compressor. The acceleration torque can be obtained by electronic differentiation of signals representative of speed of the Diesel engine.

When used with a hydrostatic transmission, the control system in accordance with the present invention permits change of the operating characteristic of the transmission motor when the compressor has a certain, predetermined displacement. As the fluid, that is, the hydraulic displacement motor changes characteristics, change of the displacement pump can be blocked electronically; since the position of motor and pump is reversible, the reverse can likewise be commanded electronically, that is, during change in position of the compressor displacement, the motor displacement is maintained constant. The system in accordance with the present invention has the advantage that various control characteristics, as well as non-linear relationships which relate the control characteristics, can readily be combined. Thus, control for starting can be combined with control for operation under essentially steady state conditions. Start control can be effected as a speed control system; in accordance with another embodiment, however, start control can be effected by controlling motor power output, or by operating on another parameter, for example acceleration. The range of supervisory control upon starting can be limited to a predetermined maximum value by limiting the displacement volume of the hydraulic fluid of the fluid displacement pumpmotor system in the variable ratio transmission. Other limits can be obtained by manually providing selected maximum operating conditions. The maximum limits can be variable, for example by manual setting. The Diesel engine speed can be variable when the vehicle, in which the Diesel engine is installed, is in starting condition. Maximum output torque can be limited by a fixed reference value, or by dynamic function generation of dynamic application of the static characteristics. Such changes, that is, function generating or processing of signals can readily be carried out electronically. Limiting of acceleration may, in accordance with an advantageous feature of the invention, be effected by modulating start control signals with a signal providing for pressure limitation in a hydrostatic fluid drive variable transmission coupled to the engine. Acceleration limit may, in accordance with another embodiment, also be carried out by an additional signal characteristic of acceleration which then controls the signal which limits the hydraulic pressures arising in the hydraulic transmission. The additional acceleration signal can be electronically generated for example by differentiation of the speed of the engine, the speed of the displacement pump, or compressor, the speed of the displacement motor, or the like.

The invention will be described by way of example with reference to the accompanying drawings, wherein:

FIG. 9 is a schematic linkage diagram showing a mechanical function generator;

FIG. 10 is a schematic diagram showing a tachometer generator;

FIG. 11 is a schematic diagram of a center, or reference level shift circuit;

FIG. 12 is a schematic diagram of a circuit element operating similarly to a high-pass filter, or slow differentiator, and giving preference to signals having rapid changing characteristics;

FIG. 13 is a schematic diagram of a multiplicating stage;

FIG. 14 is a schematic diagram of a vehicle direction control system;

Figure 2:
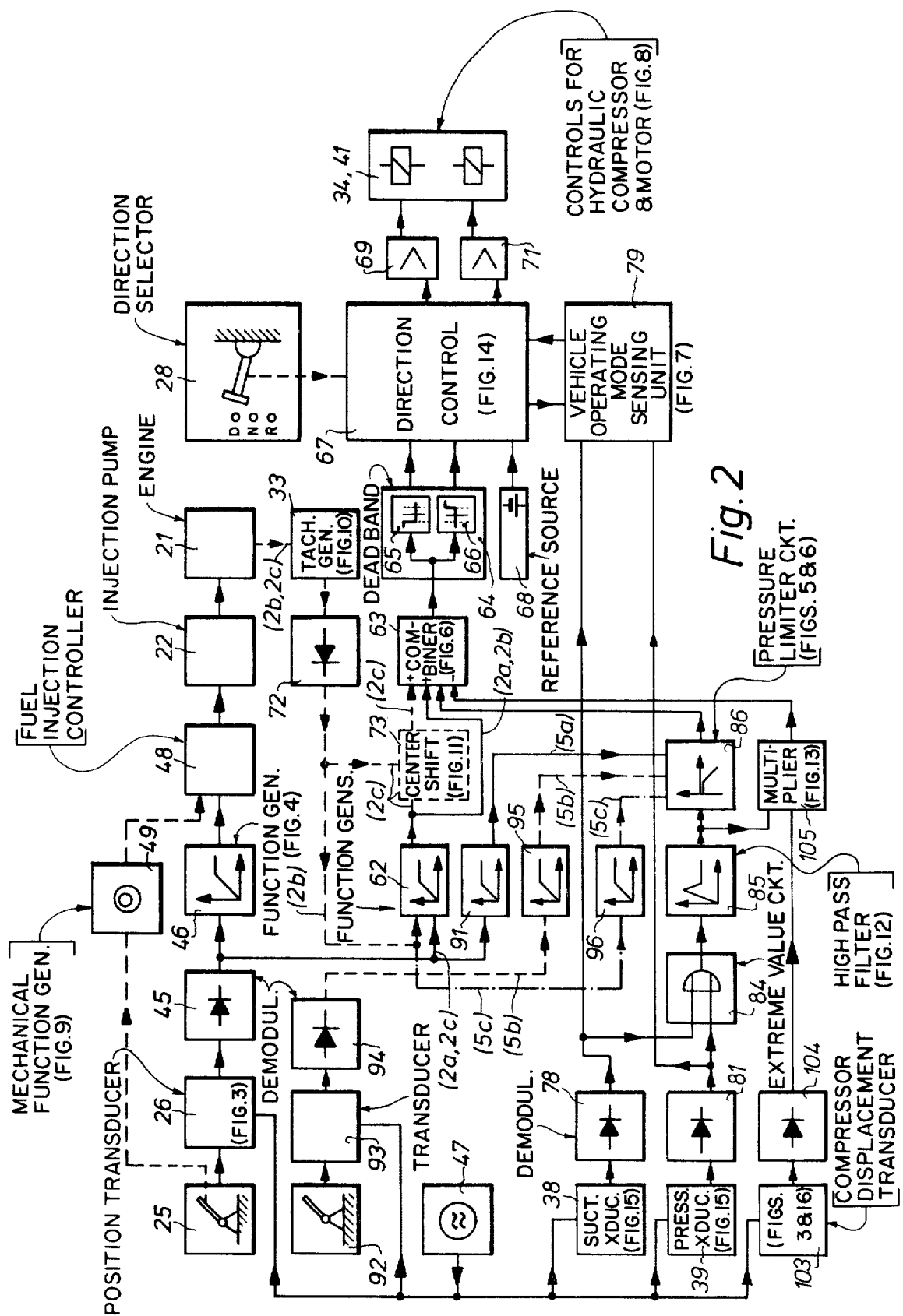
FIG. 2 is a detailed schematic block diagram of the control system, and the relationship of various transducers from which signals are derived which are processed in the control system.
Figure 4:
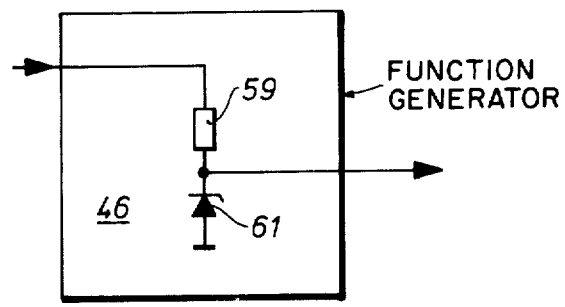
FIG. 4 is a schematic diagram of one form of function generator.
Figure 17:
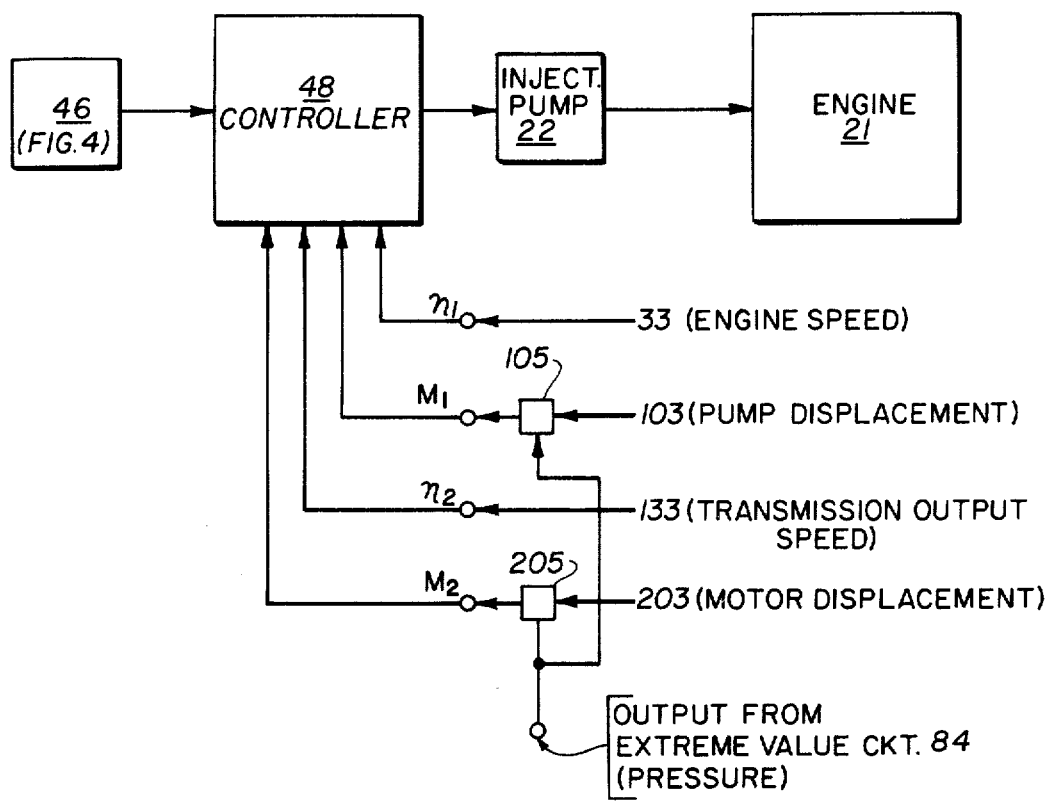

FIG. 16 is a schematic diagram of a wobble plate, or swash plate variable speed transmission system, using hydraulic swash plate machines, and also illustrating associated transducers providing output signals representative of displacement volume of hydraulic fluid in the variable transmission system; and FIG. 17 is a schematic block diagram of another embodiment of the control system of FIG. 2, and illustrating only those portions of the control system of FIG. 2 which differ from the system of FIG. 2, the block diagram of FIG. 2 tying in also with the schematic diagram of FIG. 4.

A Diesel engine 21 (FIG. 1) receives fuel from an injection pump 22, which injects fuel, under pressure, at the proper operating time to the Diesel engine. The operating linkage to control the amount of fuel being injected includes a link system 23, and an angle link system 24 which is connected to an operator pedal 25, typically the control or accelerator pedal of the vehicle in which the Diesel engine 21 is installed. A transducer 26 is additionally associated with the operator pedal 25 to provide an output signal representative of deflection of the operator pedal 25 from a rest position. A controller 27 is provided, to which input signals representative of various operation, and operating parameters are applied, including the operator command signal from transducer 26. A direction selector 28, having positions "drive", "neutral", and "reverse" provides representative signals to the controller 27, to command the direction of operation of the vehicle.

The Diesel engine 21 is mechanically connected to a multiple output gear box 29, which has an auxiliary power output shaft 31 and, further, is connected to the compressor or pump portion of a hydraulic displacement machine 32. A speed transducer 33 is connected to the hydraulic displacement machine 32 to provide a speed signal representative of Diesel engine speed, and hence of the compressor. The output of speed transducer 33 provides a speed signal which is applied to controller 27. The hydraulic displacement machine 32 is controlled by means of a controller 34 which is provided to change the displacement volume at which the displacement pump 32 operates. The compressor control 34 receives an output from the controller 27. The compressor 32 is hydraulically connected to a suction line 35 and provides hydraulic pressure at an outlet or pressure line 36. The lines 35, 36 may be short, and may form part of a connecting block 159 (FIG. 16), connecting the displacement pump 32 with a hydraulic displacement machine 37, operating as a displacement motor which, physically, preferably is similar to compressor 32. Of course, the function of the hydraulic connecting lines 35, 36, that is, whether they carry pressure, or are the suction lines, can be reversed. A controller 41 for the displacement machine 37 is likewise connected to and controlled by the controller 27. A first pressure transducer 38 is connected to the suction line 35; a second pressure transducer 39 is connected to the outlet line 36. The outputs from the pressure transducers 38, 39, providing hydraulic pressure signals, are connected to the controller 27.

Mechanical output from displacement motor 37 is connected to a shaft 43; the hydraulic units and the engine are secured to the frame of the vehicle, shown schematically at 42.

Basic operation: The system is installed in a vehicle. The operator of the vehicle first selects the direction of vehicle motion by suitably placing selector lever 28 in the drive or reverse position. (A neutral position is also provided). Assuming that the Diesel engine 21 has been started, and upon operation of the pedal 25, linkage 24, 23 will transmit a displacement to the injection pump 22. An injection pump controller associated with pump 22 provides suitable amounts of fuel to engine 21. The displacement angle of the operator pedal is further transmitted by transducer 26 to controller 27. By means of a function generator within the controller 27, a command signal is thus available in the controller 27.

The controller 27 provides suitable output signals to the compressor controller 34 and the motor controller 41, processing signals applied by the speed transducer 33, and the pressure transducers 38, 39, as well as a transducer 103, which measures the displacement provided by the hydraulic displacement machine 32 (the displacement transducer 103 could, also, be connected to the displacement motor 37).

In order to obtain a position signal for the compressor controller 34 and the motor controller 41, the command value for the input torque $M_1$ to the variable speed ratio transmission provided by the hydraulic displacement machines 32, 37 must be determined. To obtain a signal which is representative of the actual value of input torque $M_1$, the signals from pressure sensors 38, 39, measuring the respective pressures in lines 35, 36 are processed to obtain the highest, or extreme value of the signals which, then, is further processed by combining therewith the signal from a displacement transducer 103 which measures the volume of displaced hydraulic fluid passing through lines 35, 36. A signal is obtained within the controller 27 which is representative of the actual value of the displacement of pump 32, forming a representation of the speed ratio of the transmission formed by the displacement machines 32, 37. The signal is limited by controller 27 so that maximum permissible pressures in lines 35, 36 are not exceeded. The output from controller 27, then, will be a signal which is representative of the deflection position of operator pedal 25 on the one hand, as processed by the various transduced signals applied to the controller, and which provides suitable outputs to the hydraulic displacement machine controls 34, 41 which, typically, are valves controlling flow of hydraulic fluid to the respective hydraulic machines 32, 37, and/or flow in the lines 35, 36.

Figure 1:
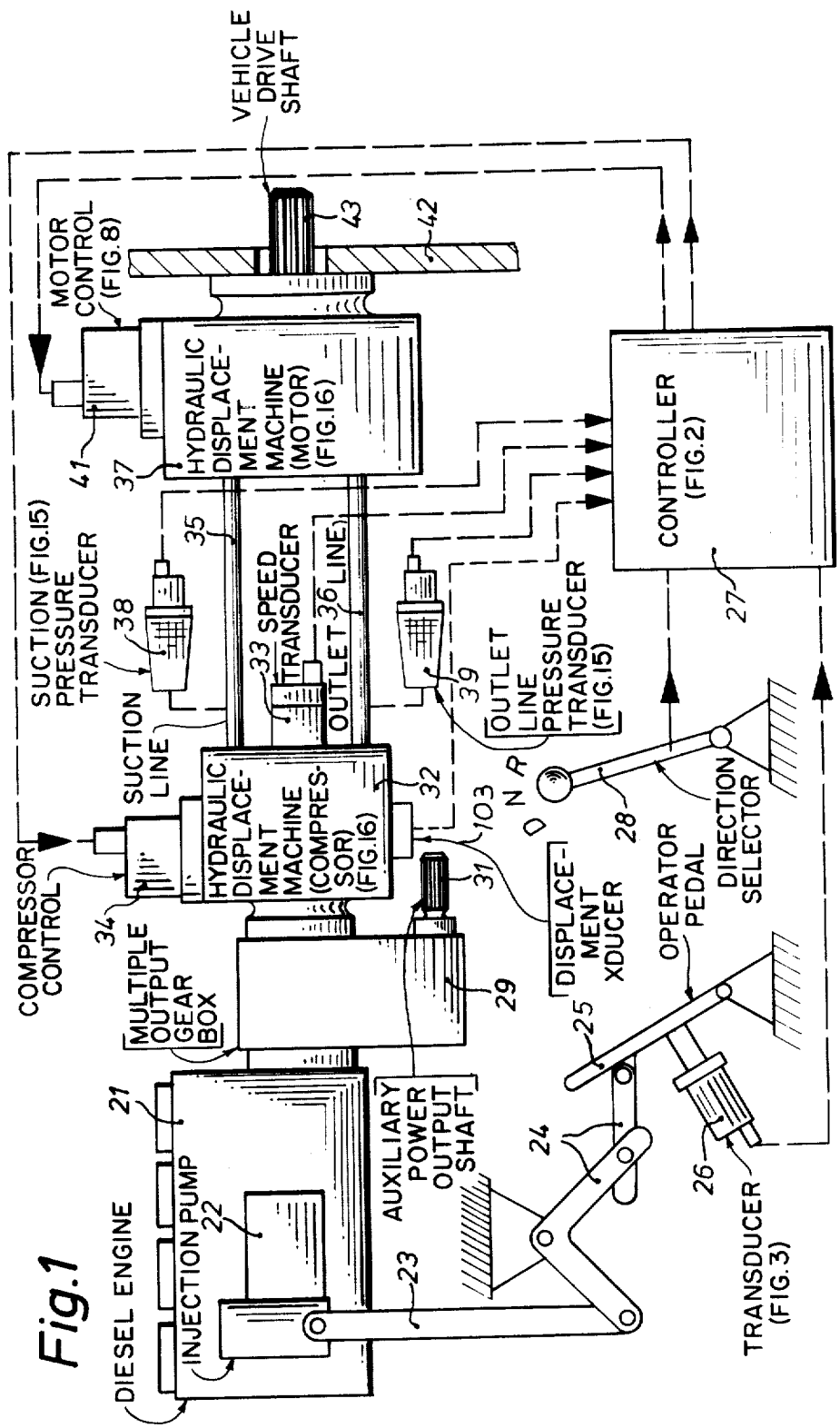
FIG. 1 is a highly schematic overall view showing the control system applied to a Diesel engine adapted for installation in a vehicle, and having an output shaft to drive driven wheels of the vehicle, as well as an auxiliary power take-off shaft.

Referring now to FIG. 2 where parts similar to FIG. 1 have been given the same reference numerals: The output signal from position transducer 26, connected to operator controller 25 is connected to a demodulator 45 which has its output connected to a function generator 46. A main oscillator 47 which, for example, may be an astable multivibrator, is connected to the position transducer 26 to provide operating power thereto. The output from function generator 46 is connected to a fuel injection controller, the output of which, in turn, is connected to the control input of the injection pump 22. The fuel injection pump 22 supplies the internal combustion engine, in the example Diesel engine 21 with fuel.

Connected in parallel to the position transducer 26, and the chain comprising elements 45, 46, 48 is a mechanical function generator formed by linkages 23, 24, and schematically illustrated as unit 49 which is also connected to the fuel injection controller 48, and which may serve as a back-up in case of failure of the electronic chain 26, 45, 46. If such back-up is not needed, then the function generator 49 may be omitted and the connection from controller 25 through function generator 49 and fuel injection controller 48 is therefore shown in broken lines to facilitate analysis of the diagram.

The demodulator 45 is connected not only to function generator 46 but, additionally, to a second function generator 62. The second function generator 62 is connected to a positive input of a combiner stage 63. The combiner stage 63 combines various signals, as will appear. The output of combiner stage 63 is connected to the input of a dead band circuit 64, to provide a certain dead band upon change-over of polarity of signals supplied thereto. The dead-band circuit 64 includes two parallel connected Schmitt triggers 65, 66. If the position signal supplied by the combiner stage 63 is below a predetermined average value by a set difference, then the Schmitt trigger 65 continues to conduct the position signals. If the signal, however, applied to the combiner stage 63 is by a predetermined amount above the average value, then the other Schmitt trigger 66 will conduct the position signal. The setting of the value between the average and the point at which the respective triggers 65, 66 will conduct provides an intermediate dead band. The outputs from the dead band stage 64 are connected to a direction control unit 67 which, in turn, is controlled by the direction selector 28. The direction control unit 67 has additional inputs. A constant voltage source 68, which may be termed a reference source, is connected to the direction control unit 67. An input and an output from direction control unit 67 further connect to a vehicle operating mode sensor 79. The outputs from the direction control unit 67 are connected over amplifiers 69, 71 to the controllers for the hydraulic machines, that is, the compressor and the motor 32, 37, respectively. This is the basic control path and the respective connection path is indicated in FIG. 2 by lines 2a.

Engine 21 is coupled to tachometer generator 33, as shown in FIG. 1 through the hydraulic compressor 32, or it could be coupled directly or, for example, from the gear box 29. Regardless of how connected, tachometer generator 33 provides a speed output signal $n_1$, which is representative of speed of the engine 21. The output signal of tachometer generator 33 is connected, through a demodulator 72, to a further input of the function generator 62, as shown by broken line 2b. The output of the function generator 62 is connected to the positive input of combiner 63, as in the circuit path 2a, and the connection line has been marked accordingly. The connection between demodulator 45 and the function generator 62 may then be omitted. A center shift circuit 73 is connected to the output of function generator 62 between the output thereof and a positive input of combiner 63. The center shift circuit 73 is controlled by a connection from the demodulator 72 (receiving the speed signal $n_1$ from tachometer generator 33). The signal from demodulator 45 is applied to function generator 62, as indicated by the input connection 2a, 2c. The center shift circuit 73 shifts the value of the signal derived from function generator 62 in accordance with a value of the speed signal $n_1$, derived from demodulator 72 and tachometer generator 33.

Pressure transducers 38, 39 are supplied with operating power from the oscillator 47. The outputs of the suction pressure transducer 38 and the outlet pressure transducer 39 are connected to respective demodulators 78, 81 which, together with the associated circuits forms the major elements of the control unit 27. The pressure transducer 38 can be connected as a displacement transducer, similar to displacement transducer 26. The output derived therefrom is rectified in the demodulator 78, the output of which, in turn, is connected to the vehicle operating mode sensing unit 79. The output of the pressure transducer 39, after rectification in demodulator 81, is likewise connected to vehicle operating mode sensing unit 79 which, in turn, is connected to the direction control unit 67.

The demodulators 78, 81 are additionally connected to an extreme value circuit 84. The output of this extreme value circuit which may be similar to an OR-gate supplies that one of the signals applied thereto which is greater than the other, at its output to a preference circuit 85 which, in its simplest form, is a high-pass filter. Preference circuit 85 preferentially transmits signals of short duration. The output of preference circuit 85 is connected to a pressure limiting circuit 86 to provide a pressure limiting signal.

Demodulator 45 is connected to a further function generator 91 which has its output connected to the pressure limiter circuit 86. The line connecting function generator 91 to the pressure limiting circuit 86 is shown at 5a.

The system of the present invention is particularly applicable to provide for additional control of the engine 21 when separate output from the auxiliary power output shaft 31 is desired. A separate operator pedal 92 for this output is provided, which is mechanically connected to a transducer 93 (in actual construction, preferably similar to transducer 26 and supplied by power from oscillator 47). A rectifier or demodulator 94 rectifies the output from transducer 93 and applies it to a separate function generator 95 which is connected by means of line 5b to another input of pressure limiting circuit 86.

The rectified, demodulated speed signal $n_1$ from tachometer generator 33, as derived from demodulator 72 may be applied over a line shown in chain-dotted representation to another function generator 96, the output of which, on the line 5c, is further applied to the pressure limiting circuit 86. Any one of the inputs to the pressure limiting circuit 86 may control the pressure limiting unit; it is thus necessary only that one of the input lines 5a, 5b, 5c is connected to the pressure limiting circuit 86.

A compressor displacement transducer 103 is connected to the compressor 32 in such a manner that the displacement volume is sensed thereby. In one form of the invention, unit 103 (FIG. 16) measures the angle of inclination of the swash plate, or wobble plate of the respective hydraulic machine, preferably the compressor 32. The output signal from transducer 103 is rectified by demodulator 104 and connected to one multiplication input of multiplier 105. The second input to multiplier 105 is derived from the output of the preference circuit (high-pass filter) 85. The output of multiplier 105 is connected to an inverting input of combiner stage 63. By measuring the inclination of the swash plate of the hydraulic machine, and the speed of the hydraulic machine, as well as the pressure in the connected lines, the torque of the shaft connected to the respective machine can be determined and a corresponding electrical signal can be derived.

Operation: After starting of the engine, the direction of movement of the vehicle is selected by the direction selector 28. The operator pedal 25 is then operated, the fuel injection controller controlling the amount of fuel to be injected by injection pump 22 to the engine 21, either by the electronic chain 26-45-46-48, or by the mechanical linkage 49. The position of the operator pedal 25, that is, the angular deflection $\alpha$ thereof is transduced into an a-c signal in transducer 26, and rectified in demodulator 45 to provide a position command signal at the output thereof, generally proportional to the deflection $\alpha$ of the operator controller 25. The non-linear relationship between fuel to be injected and operator controller position is obtained in the function generator 46 which provides an output voltage to the fuel injection controller 48 relating operator pedal deflection to proper injection volume. Deflection of the operator controller 25 thus controls the commanded speed of the motor 21.

A positioning signal must be generated to determine the transmission ratio of the variable ratio transmission connected to the Diesel engine, in the particular example the transmission ratio of the hydraulic machines 32, 37, one of which is connected to the output shaft of the Diesel engine through gear box 29, and the other providing output torque to the vehicle wheel on shaft 43. Various possibilities to generate such a signal, containing various degrees of control under different operating parameters present themselves. The system of the present invention is versatile.

In its simplest form, a signal is derived which is representative of the command signal of the input torque $M_1$ of the variable ratio transmission. This signal is derived, in its simplest form, from the position transducer 26, demodulator 45 and the function generator 62. Function generator 62 converts the linear relationship of the output signal of the modulator 42 with respect to the deflection $\alpha$ of the operator controller 25 to a non-linear relationship.

The commanded signal for the input torque $M_1$ is compared with the actual input torque $M_1'$ of the Diesel engine in the combiner stage 63. To obtain an actual torque signal, that is, to obtain a signal which is representative of the actual torque of the input to the variable speed transmission, the pressure transducers 38, 39 measure the pressure in the respective lines 35, 36; the extreme-value circuit 84 selects th greater one of the signals applied by the associated demodulators 78, 81 and provides this extremevalue signal over the preference circuit 85 to the multiplier 105. Compressor displacement transducer 103, which measures the angle of deflection $\beta$ of the swash plate of compressor 32, provides a signal representative of actual volume displacement $V_1$ of the compressor 32. Upon multiplication in multiplier 105, a signal is derived which is used to compute the actual value of the input torque $M_1$ to the variable ratio transmission 32, 37.

The pressure limiter 86 has a signal from the preference circuit 85 applied thereto, as well as at least one of the signals from function generators 91, 95, 96, respectively. The pressure limiter circuit 86 provides an output signal when the pressure on one of the lines 35, 36 exceeds a predetermined pressure limit, and thus a predetermined value of the output signal of the preference circuit 85 is likewise exceeded. The output signal of pressure limiter 86 then is combined in the combiner 63 with the control signal to be derived therefrom. The value of the pressure, at which the limiter 86 responds depends on the position of the deflection $\alpha$ of the operator controller 25, or 92, respectively, or engine speed, that is, in general depends on control of the engine 21. Pressure limiter circuit 86 includes a difference amplifier to which the output representative of an engine operation, or command parameter is applied as one input, the output from preference circuit 85 being applied as the other.

In operation, an internal combustion engine and more particularly a Diesel engine 21 should not drop in speed below a minimum speed. Speed transducer 33 provides a signal $n_1$ measuring the speed of the internal combustion engine. When this output signal drops below a predetermined level, demodulator 72 will supply only a very low voltage. This low voltage is applied over lines $2b$ and $5c$ to the function generator 96 which, over line $5c$, modifies the operation of the pressure limiting circuit 86 to change the pressure limit. By changing the pressure loading on the hydraulic machines, the Diesel engine 21 can thus be unloaded, providing for an increase in speed thereof (assuming constant operator controller 25).

The engine 21 should not be overloaded. Overload is prevented as follows: The output voltage derived from demodulator 72, representative of engine speed, is applied to the function generator 62. This output voltage is thus modified, in accordance with the transfer function of the function generator 62, and the output of the function generator will be a signal which is representative of the command signal of the input torque $M_1$ to the variable ratio transmission. If this way is selected then, of course, the connection between demodulator 45 and function generator 62 should be broken.

The engine, in combination with the control system as described, has particularly good acceleration characteristics. The speed of the engine 21 should be raised, independent of loading on the engine, if acceleration is desired. This increase in speed provides for a higher power reserve of the engine. The function generator 62 does not transfer that voltage which corresponds to the actual speed of the engine 21; rather, the function generator is so set, that is, has such a transfer function that the output signal is representative of a lower speed. The combiner stage 63 will thus have applied thereto an input signal which simulates a lower speed of input torque $M_1$, thus, simulates lower loading on the engine 21. This, in turn, provides for a power reserve, permitting the engine 21 to speed up.

Operation under acceleration is further improved by shifting the center position of the signal applied from function generator 62. Referring, specifically, to the line connections marked $2c$ in FIG. 2, the position $\alpha$ of the operator controller 25 commands the position of the fuel injection controller 48 to provide a certain injected fuel through pump 22 to the engine 21. Commanding increased speed from controller 25 additionally, however, provides an output signal from function generator 62 to provide a command signal for the input torque $M_1$ to the variable ratio transmission. The null, or center point of the output voltage derived from the function generator 62 is shifted in the center shift circuit 73 upwardly, so that the combining stage 63 will have a signal applied thereto which simulates a smaller input torque $M_1$. This center, or zero, or null shift in element 73 is carried out by means of a difference amplifier in the element 73 which, in turn, is controlled by the output speed signal $n_1$, derived from tachometer generator 33 and demodulator 72, as seen by the broken connection lines 2c.

The system in accordance with the present invention is particularly useful in connection with vehicles which have auxiliary power take-offs, that is, which have a multiple output gear box 29 with an auxiliary power shaft 31. Such systems are used particularly in agricultural tractors, which have additional power take-off shafts, fork lift trucks, and the like. The speed of the auxiliary power output shaft 31 can be controlled either directly by the operator pedal 25; or, additionally, the vehicle should be movable independently of speed of the auxiliary output shaft. The auxiliary pedal 92, with the associated transducer 93 and demodulator 94, and the function generator 95 are provided to permit independent control. For example, the operator completely deflects the operator controller 25 to thereby increase the speed of the Diesel engine 21 to a maximum to drive, over the auxiliary shaft 31, an auxiliary power element at maximum speed. The vehicle, itself, may be stationary (by moving the direction selector into neutral-N-position). Another solution, if the vehicle move only slightly or not at all, would be to instruct the operator to depress the auxiliary controller 92. The transducer 93 and the modulator 94 then provide a signal to the associated function generator 95 which is connected to the pressure limiter 86. The pressure limiter 86 thus will have a signal applied thereto which depends on the position of the auxiliary pedal 92, over line 5b. The combiner stage, receiving the output signal from pressure limiter circuit 86 then controls the pressure within the hydraulic transmission to drop pressure in the transmission 32, 37, thus inhibiting, effectively, movement of the vehicle as commanded by rotation fo the output shaft 43.

In the circuits described, the combiner stage 63 compares the equivalent values of the signal representative of commanded torque $M_1$ with signals representative of actual torque $M_1'$ applied to the variable speed transmission. The output from combiner stage 63 then is a control signal in analog form. Dead band circuit 64 provides a dead band for the analog control signal, and transposes the analog control signal into two separate digital signals. If the analog control signal is below a predetermined negative value, Schmitt trigger 65 will provide a signal to the direction control unit 67 to control one direction of movement; if the control signal is above a predetermined positive value, the second Schmitt trigger 66 will provide a signal to the direction control unit 67 in the opposite direction. The dead band or dead zone in response between the two Schmitt triggers 65, 66 prevents constant change-over in operation of the controls 34, 41 for the hydraulic machines, since the analog signal, when it has a value which is within this dead band, will not be transmitted to the direction control 67 at all.

The direction controller 67 receives the signal in digital form from the dead band circuit 64 and applies it over amplifiers 69, 71, respectively, to the controls 34, 41 of the hydraulic compressor and motor 32, 37, respectively. The direction of connection of the controls 34, 41 depends on the position of the direction selector 28, and on the signal derived from the vehicle operating mode sensing unit 79. The selector 28 is provided to permit the operator to select forward, reverse motion, or no movement at all; the signals derived from the dead band circuit 64 are applied to the respective amplifiers 69, 71 and to the controls 34, 41 of the hydraulic machines directly, or with inversion, depending upon the position of the direction selector lever 28; if the direction selector lever is set in neutral, the signals are not transmitted to the controls 34, 41 at all.

The signals derived from the dead band circuit 34 must be reversely polarized if the vehicle is externally driven, for example is coasting downhill, or is being pushed. When the vehicle is to accelerate under power of the engine 21, that is, when it is being driven by the engine, the pressure and displacement volume of hydraulic fluid passing through the hydrostatic variable speed transmission must increase; this requires increasing deflection of the swash plates, or wobble plates of the hydraulic machines. If the vehicle is being pushed, or is coasting downhill, the displacement volume must be increased although the pressure must be decreased; this requires that the swash plates of the hydraulic machines have lesser deflection. The vehicle operating mode sensing unit receives information from the pressure transducers 38, 39, which measure the pressures in the lines 35, 36. The vehicle operating mode sensing unit additionally receives information from the direction selector 28. The output signal of unit 79 then controls connection of digital signals through the direction control unit 67 to pass either directly, or with reversed polarity.

The various elements and units referred to in the specification will now be described with reference to FIGS. 3–16.

Figure 3:
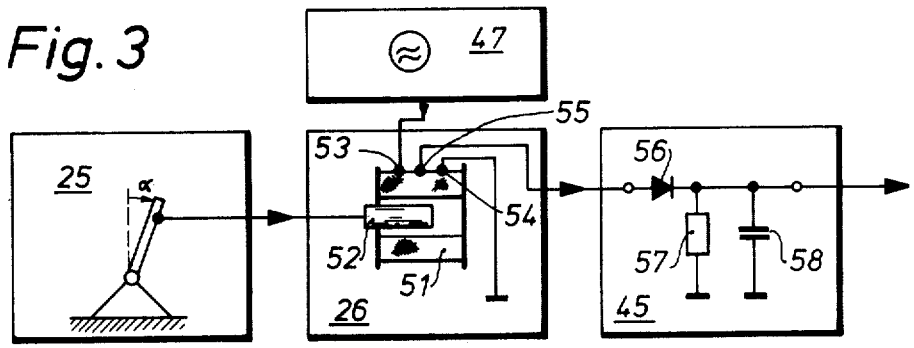
FIG. 3 is a schematic block diagram showing a position transducer, for example to provide a signal representative of accelerator pedal position.

Operator controller 25, transducer 26, demodulator 45, FIG. 3: Upon deflection of the operator controller typically the accelerator pedal 25, by an angle $\alpha$, a link shifts the position of a core 52 within a coil 51 which is connected as a differential inductance, supplied with a-c power from oscillator 47. One terminal of inductance 51 is connected to the output of the oscillator 47, the other terminal 54 being connected to chassis or ground. A tap, preferably a center tap 55 is connected to the demodulator 45 which includes a diode 56, and a parallel R/C circuit 57, 58. Capacitor 58 is a smoothing capacitor. Demodulator 45 rectifies the a-c signal derived from the transducer 26.

Function generator 46, FIG. 4: A series resistor 59, in series with a Zener diode 61 is connected between input and output, the output being taken from the junction between the resistor and the Zener diode 61. Upon application of a d-c voltage to the function generator, the output voltage will first rise proportionately to the input voltage; when the Zener voltage is exceeded, however, the output voltage will rise hardly anymore, even though the input voltage may continue to increase. The output signal from the function generator thus is a distorted version of the input signal, that is, has been processed in accordance with the transfer function of the element 46. The other function generators which are also signal distorting devices, and shown in blocks 62, 91, 95, 96 of FIG. 2, may be of similar construction.

Figure 5A:
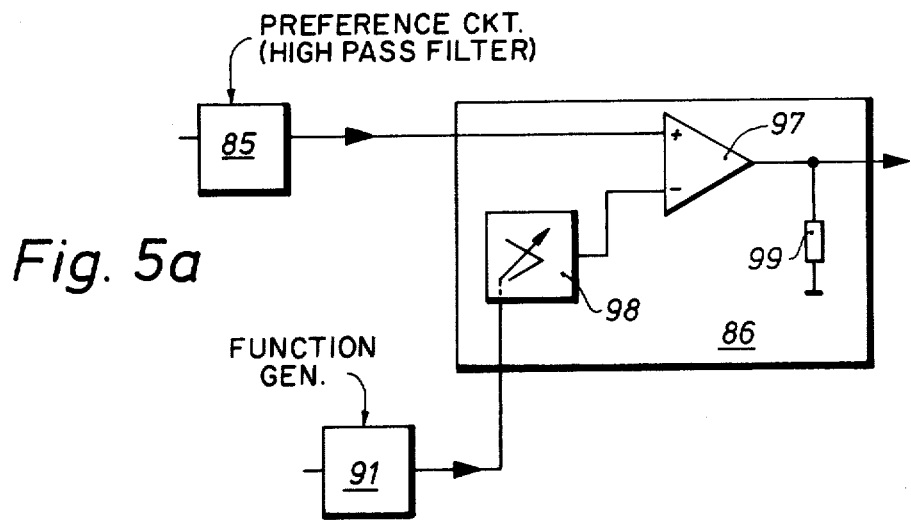
FIG. 5a is a schematic block diagram illustrating one form of pressure limit circuit.
Figure 5B:
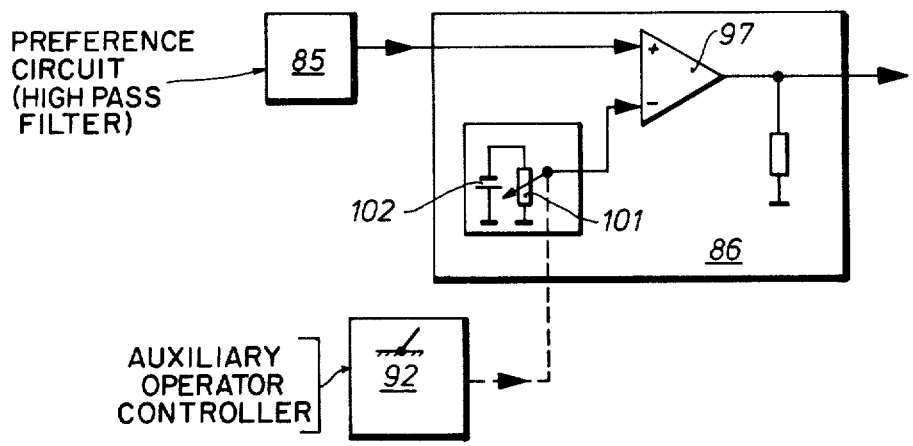
FIG. 5b is a schematic diagram illustrating another form of a pressure limiting circuit.

Pressure limiter circuit 86, FIGS. 5a and 5b: A differential amplifier 97, typically an operational amplifier, has its direct input connected to the output of the preference circuit 85. The inverting input of the differential amplifier 97 is connected to the output of a control amplifier 98. Control amplifier 98 provides a d-c voltage, the extent of which is controlled by the output from function generator 91. The output derived from differential amplifier 97 is connected across a load resistor 99, the other terminal of which is connected to ground.

The modification illustrated in FIG. 5b is essentially similar to that of FIG. 5a, except that it is designed for a simplified additional control function. A controller similar to controller 92 has its output coupled to a slider of a potentiometer 101 (FIG. 5b) which is connected across a constant source of a reference voltage 102. Depending on the position of the operator controller, coupled to the slider of potentiometer 101, an input voltage is applied to the inverting input connection of operational amplifier 97, of greater or lesser amplitude.

Figure 6:
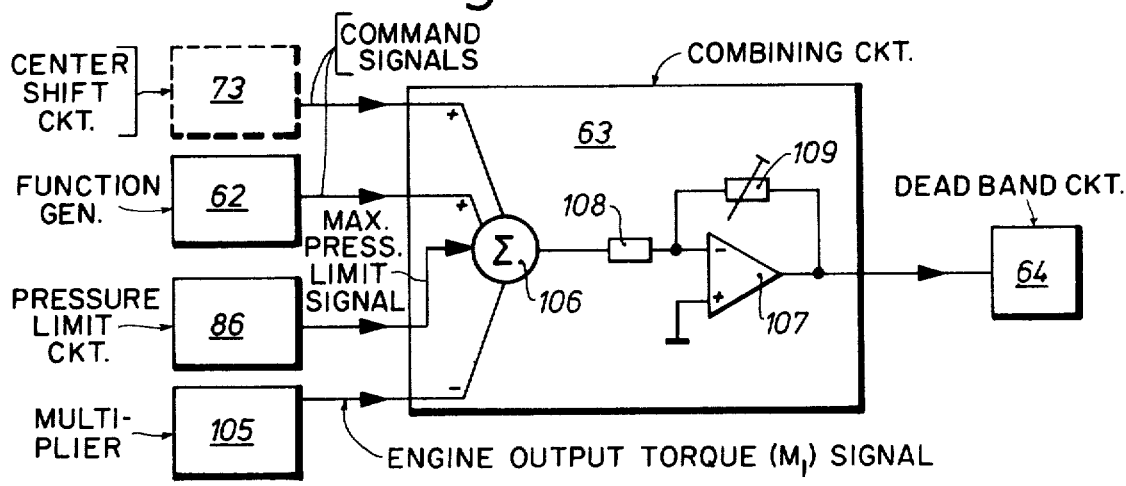
FIG. 6 is a schematic diagram of a multiple input signal combining stage.

Combiner stage 63, FIG. 6: The combiner 63 includes an adder circuit 106 having three positive, or direct and one inverting input. The inverting input, in effect, is a subtracting input, since the adder stage will add algebraically, depending on sign of the input. The positive or direct inputs are connected to the function generator 62, the pressure limiter 86, and the multiplier 105; if desired, an additional input is provided from the center shift or null shift circuit 73. Since this is not strictly necessary, circuit 73 is shown in dashed lines. The summing circuit 106 preferably has all the four inputs, as shown, however, even if one is not used. The output from the adder circuit 106 is transferred over a resistor 108 to the inverting input of an operational amplifier 107 which has an adjustable feedback resistor 109 in its feedback circuit.

Figure 7:
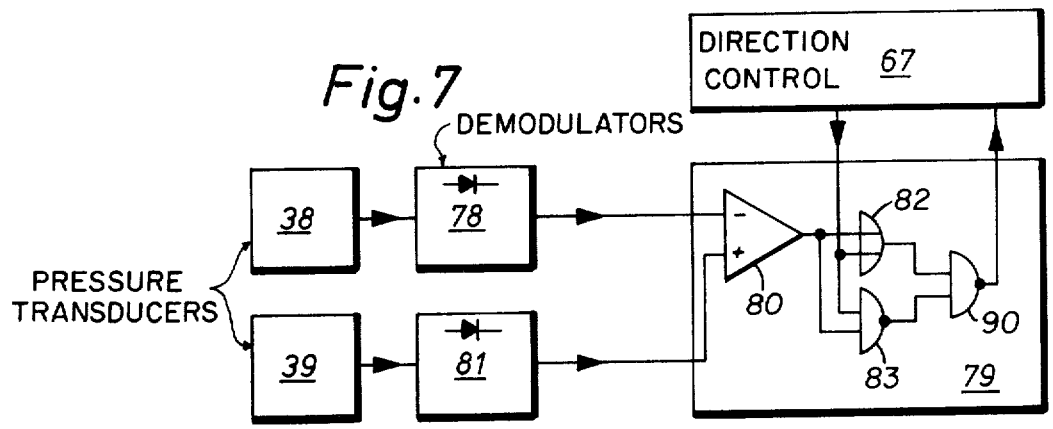
FIG. 7 is a schematic diagram of a circuit sensing vehicle operating mode.

Vehicle operating mode sensing unit 79, FIG. 7: An operational amplifier 80, connected as a comparator, has its input connected, through the demodulators 78, 81, as derived from the respective pressure transducers 38, 39. The output of the operational amplifier 80 is connected to one input of an OR-gate 82 and, likewise, to one input of an NAND-gate 83. The input line from direction control unit 67 is connected to the other input of the respective OR-gate 82 and NAND-gate 83. The outputs from the two gates 82, 83 are connected to a further NAND-gate 90, the output of which is connected to the direction control unit 67.

Figure 8:
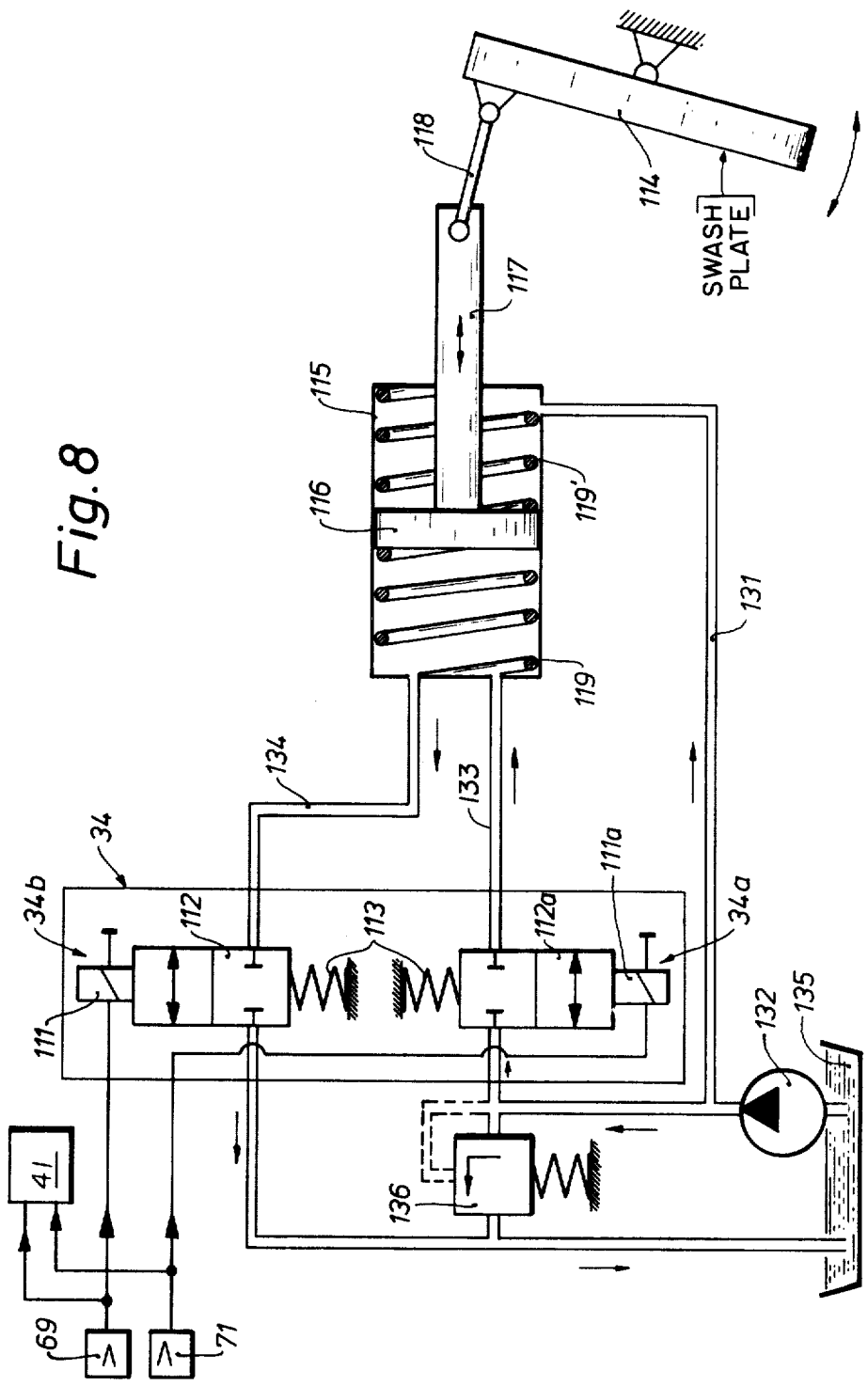
FIG. 8 is a schematic diagram illustrating inclination control of a wobble plate, or swash plate of a hydraulic machine unit.

Hydraulic engine control 34, 41, FIG. 8: The control units 34, 41 act on the hydraulic displacement machines to change the position of the swash 114, that is, to change the inclination thereof. The positional change of the swash plate 114, which is shown only schematically, may of course be a positional change which is applied to a transfer element from which the actual swash plate inclination is controlled.

The hydraulic machines 32, 37 may be identical, and hence the control units 34, 41 likewise will be identical, and the description will be restricted to the element 32 with its controller 34. The controller 34 is constructed as an electromagnetically operated hydraulic valve controller, which includes a winding 111 operating a two-way (ON-OFF) valve 112. The ON-OFF valve 112 is maintained by a spring 113 in such a position that the flow of fluid through the valves 112 is blocked if the winding 111 is not energized. Windings 111, 111a of the controller 34 are separately connected to the amplifiers 69, 71, forming the output of the direction control unit 67 which, in turn, is controlled through the dead band circuit 64 from the combiner 63. The output signal from direction control unit 67 is a digital signal. The controller 41 for valve 37 is similarly connected, as schematically indicated in FIG. 8.

The swash plate of the hydraulic engine operating as a motor is moved parallel, but in opposite direction to the position of the swash plate of the engine operating as the pump, or compressor. A hydraulic positioning cylinder-piston unit 115, 116, operating over piston rod 117 and a line 118, is mechanically coupled to the respective swash plate 114. Piston 116 is maintained in centered position by a pair of springs 119, 119', unless hydraulic pressure is applied to the piston 116 from either direction. The piston rod 117 decreases the effective piston surface on which hydraulic pressure can act with respect to the opposite piston surface which does not have a piston rod connected thereto. The decrease in area is about 50 percent. A pressure line 131 is connected to cylinder 115 at the side of the piston where the piston rod 117 is connected. This pressure line 131 is directly connected to a pump 132, supplying hydraulic pressure. The side with the larger piston area is connected to control lines 133, 134 which, in turn, lead to the valves 34a, 34b forming, together, the control unit 34. The valve 34a is similar to the valve 34b, having likewise an electromagnetic control coil 111a and a hydraulic valve system 112a of the ON-OFF type. Control line 133, which is connected to the outlet side of the associated valve element 34a can be supplied with hydraulic pressure from pump 132. The control line 134 which is connected to the outlet of the associated valve element 34b continues to a drain line which connects to the sump 135 from which hydraulic pressure can be supplied by pump 132. A pressure limiting valve 136 is provided, connected in known manner, so that the output pressure delivered by the pump 132, as available at the pump outlet side, will always be constant and uniform. For finer control, an intermediate line connection can be provided, as known, as shown in dashed lines in FIG. 8 between the pump high-pressure side and the pressure limiting valve 136.

Upon energization of any one of the coils 111, or 111a, respectively, by a digital signal, pressurized fluid will be applied to the larger area of the piston 116 to move the piston to the right or may be drained from the larger area, thus permitting pressure applied to the side of the piston 116 having the smaller area to move to the left, thus shifting the inclination of the swash plate 114 of the respective hydraulic machine, and thereby changing pressure, and flow rate of operation of the hydraulic transmission, thus changing the transmission ratio.

Mechanical function generator 49, FIG. 9: The operator controller 25 is connected over a double-armed lever 24 to the control rod of the Diesel engine fuel injection pump 22. The double-armed lever can pivot over a fixed point, as is clearly apparent in FIG. 9, drawn to a scale different from that of FIG. 1.

Tachometer generator 33, FIG. 10: A drive shaft 74 connected, for example, to the engine, to gearing driven from gear box 29, to the rotating element of the hydraulic machine 32, or to the hydraulic machine 37, or to output shaft 43 — depending on the signal desired — has a star wheel 75 secured thereto to rotate in synchronism with the shaft 74. The projections of star wheel 75 are alternately differently magnetized, as seen in FIG. 10. A yoke 76 completes the magnetic circuit between opposite poles of the star wheel. A coil 77 is wound on the yoke 76. Depending on the speed of rotation of star wheel 75, a lower, or higher alternating voltage will be induced in the coil 77. This voltage is rectified in the rectifier or demodulator 72, to provide a d-c output voltage having a value representative of the speed of rotation of star wheel 75. Alternatively, the amplitude could be limited, and the frequency converted into a d-c voltage by a frequency-voltage converter, or discriminator.

Center shift, or null shift circuit 73, FIG. 11: An operational amplifier 73', connected as a differential amplifier, has its inverting input connected to the output of the demodulator 72 to receive a signal thereat representative of speed of the engine. The direct input to the operational amplifier 73 is connected to the function generator 62. Upon application of a signal to the inverting input of the differential amplifier 73' from demodulator 72, only those signals applied to the direct input which exceed a predetermined value, as determined by the signal at the inverting input, will be transferred to the output. Thus, effectively, the null, or base value of the signals transmitted by circuit 73 will be shifted, in dependence on the applied signal from the tachometer generator 33, applied to the inverting input of the differentiator amplifier 73'.

Preference circuit 85, FIG. 12: The preference circuit 85 operates like a high-pass filter, or a differentiator with a rather gradual differentiating slope. The output from OR-gate 84, forming an extreme-value circuit, is applied to a parallel R/C circuit 87, 88, the output of which is connected by a resistor 89 to ground or chassis. The circuit, therefore, operates similarly to a differentiating stage, or a high-pass filter and preferentially conducts signals which change rapidly to conduction of signals which have only a slow, or gradual variation. The output is connected to the pressure limiter circuit 86 as well as to multiplier 105.

Multiplier 105, FIG. 13: The extreme one of the pressure signals derived from transducers 38, 39, and connected over extreme value circuit 84 and preferentially transmitted over preference circuit 85 is connected to a voltage frequency converter stage 137. The output from stage 137 will be an alternating voltage of essentially constant or even amplitude but of changing frequency. The frequency level at terminal 137', thus, will correspond effectively to the amplitude of the input voltage. Such circuits are well known and may, for example, include a voltage controlled oscillator. The output signal of stage 137 is applied to a monostable flip-flop (FF) 138. The essentially sine-shaped output voltages from the converter 137 are transformed by FF 138 into a series of approximately square wave pulses, having a pulse repetition rate (PRR) corresponding to the frequency of the signal at terminal 137'. The amplitude, and the pulse width are constant. The output of monostable FF 138 is connected to one input of a pulse level - pulse length modulator 139, forming the actual multiplication circuit. The second input of the modulator 139 has a signal applied thereto representative of displacement of the compressor, as derived from displacement transducer 103 (FIG. 2) and as rectified in demodulator 104. Circuit 139 changes the pulses derived from FF 138 by either extending the pulse widths of the pulses, or the amplitudes of the pulses applied thereto (or both). The output derived from circuit 139 is then applied to a demodulator 141, that is, is rectified or averaged; thus, the pulses as derived from circuit 138 are modified, multiplicatively, by the compressor displacement signal, and these pulses then are again transformed into an analog voltage in demodulator 141, so that the output from multiplier 105 will be a signal representative of both the extreme value of the pressure signal and the compressor displacement signal, when multiplied.

Direction control unit 67, FIG. 14: A ganged switch 142 having five transfer switch 143, 144, 145, 146 and 151 is operated by the direction selector 28. The direction control 67 further includes four AND-gates 147, 148, 149, 150 which are connected to the transfer switches 143-146, 151, as shown. Further, two OR-gates 152, 153 are connected to the transfer switch 142 and the AND-gates 147, 150. One output of the dead band circuit is connected to a first switch contact of the first transfer switch 143, and a third switch contact of a second transfer switch 144. The second output of the dead band circuit 64 is connected to a third contact of the first transfer switch 143 and the first contact of the second transfer switch 144. A source of constant voltage 68 is connected to the second contact of the third transfer switch 145, the second contact of the fourth transfer switch 146 and the first contact of the fifth transfer switch 151. The switch arm of the first switch 143 is connected to a first input of the first AND-gate 147 and to a first input of the third AND-gate 149. The switch arm of the second transfer switch 144 is connected to the first input of the second AND-gate 148 and to the first input of the fourth AND-gate 150. The switch arm of the third transfer switch 145 is connected to the second input of the first OR-gate 152; the switch arm of the fourth transfer switch 146 is connected to a second input of the second OR-gate 153. The switch arm of the fifth transfer switch 151 is connected to the line going to the vehicle operating mode sensing unit 79, described in detail in FIG. 7.

The first OR-gate 153 has three inputs, the first one being connected to an output of the first AND-gate 147, the second one to the output of the fourth AND-gate 150, the third being connected to the switch arm of the third transfer switch 145. The second OR-gate 153 has three inputs, the first being connected to the output of the second AND-gate 148, the second to the output of the third AND-gate 149 and the third being connected to the switch arm of the fourth transfer switch 146. The second switch contact of the first transfer switch 143, the first and the third switch contacts of the third transfer switch 145, the second contact of the second switch 144, the first and the third switch contacts of the fourth transfer switch 146 and the second and third switch contacts of the fifth transfer switch 151 are all connected together and to ground or chassis. The output of the first OR-gate 152 is connected to amplifier 69, controlling energization of the coils 111 of valve element 34b of valve 34 (and the corresponding elements in valve 41); the output of the second OR-gate 153 is connected to the amplifier 71 which, in turn, is connected to the coil 111a of the control element 34a of the controller 34 and, additionally, to the similar elements in the controller 41 for the hydraulic displacement motor 37.

As can be seen from an analysis of FIG. 14, if the selector lever is moved from D to R, the signal supplied through the direction controller 67 from the dead band circuit are reversed; if the control lever is placed into N, or neutral position, a fixed voltage is applied to the respective coils 111, 111a to hold piston 116 (FIG. 8) in a predetermined position, and hence to move the swash plate 114 to a fixed position which causes no, or hardly any transfer of power between the hydraulic machines of the transmission 32, 37.

Figure 15:
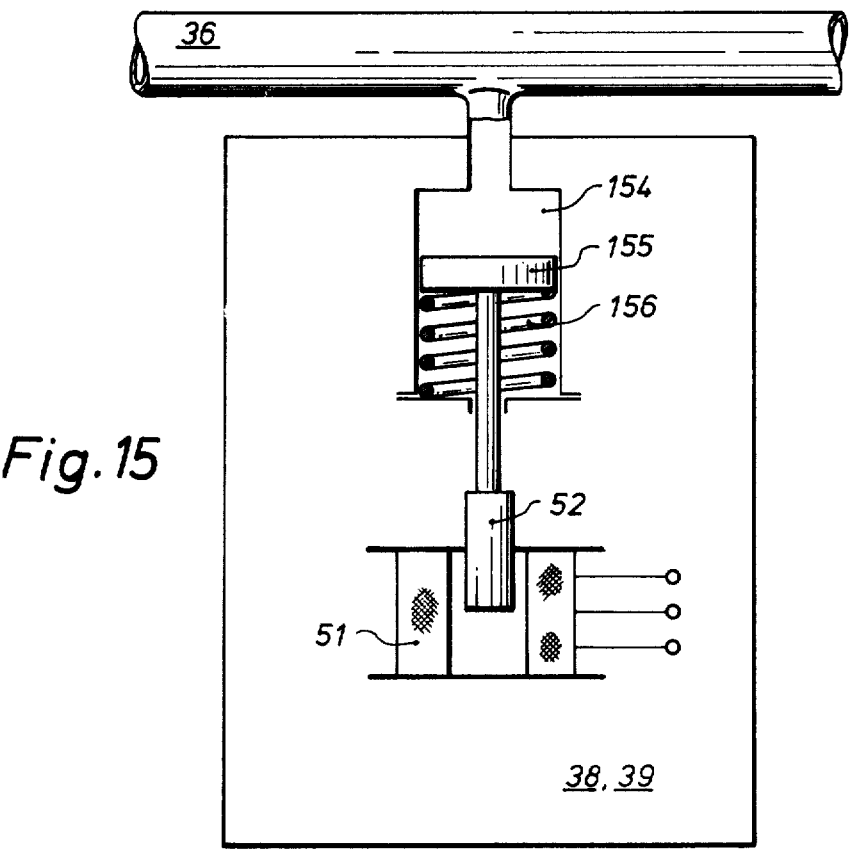
FIG. 15 is a schematic diagram of a pressure transducer.

Pressure transducers 38, 39, FIG. 15: The pressure transducers 38, 39 are identical; the respective pressure transducer is connected by a tap to the respective pressure line, pressure line 36 being shown. A cylinder 154 is connected to the tap, which includes a piston 155, which is spring biassed to upward position in FIG. 15, by means of a spring 156. Pressure in line 36 will move piston 155 downwardly, against the force of the spring pressure 156 and, upon such movement, changing the position of core 52 within a differentially wound coil 51. Core 52 and coil 51 correspond to and may be identical with core 52, coil 51 of position transducer 26 (FIG. 3). The coil 51 is similarly connected.

Hydraulic variable speed transmission 32, 37 and displacement transducer 103, FIG. 16: Basically, the displacement transducer comprises a differential inductance 51 in which a movable core 52 is located, identical to core 52 and inductance 51 of the position transducer 26, 53, or of the pressure transducer 38, 39, FIG. 15. The position of the core 52 within inductance 51 is determined by the angle of inclination $\beta$ of swash plate 114 of the hydraulic machine. The pump or compressor unit 32 is driven from a shaft 157 connected to gear box 29. The degree of inclination of the swash plate, or wobble plate 114 will determine the degree of reciprocating movement of the respective pistons 158 in the rotating cylinder unit and thus determines the displacement volume of the pump, or compressor 32. The fixed pressure transmission device 159, which preferably is a pressure block, is bored to include the high-pressure, or output line 36 and the low-pressure, or suction line 35. The pressure relationships in the lines is, of course, interchangeable. The motor unit of the hydraulic transmission 32, 37 is identical to that of the compressor or pump unit 32. A swash plate 161 is inclined under control of an inclination control rod 118', similar to the inclination control rod 118 which controls the degree of inclination of swash plate 114 (as commanded by the hydraulic position controller 34, 41, respectively, and as illustrated in detail in FIG. 8). The speed $n_1$ of the pump or compressor unit is determined by the speed of the engine 21; the output speed $n_2$ of the shaft 43 is determined by the transmission ratio of the transmission system. The position of the swash plates 114, 161, the speed of rotation, and the pressures $p_1$, $p_2$ in the respective lines 36, 35 determine the torque applied to the shaft 43 to drive the wheels of the vehicle.

Various changes and modifications may be made; features described in connection with any one of the embodiments may be used with any of the other embodiments, and elements described are deemed to be illustrative and other elements having similar operation, or signal transfer characteristics may be used. The signal transfer characteristics of the various function generators are schematically indicated within the boxes of FIG. 2 representing the various elements; the construction of these boxes are specifically explained in connection with FIGS. 3–16. These signals are illustrative and other transfer functions may be used as applicable in connection with specific engines, and specific drives for particular uses.

The control unit 27 not only includes the various function generators, and the multiplier 105, combiner 63, dead band 64 and control circuit 67, with the associated vehicle operating mode sensing unit 79. Some, or all of the demodulators connected to the various transducers may, additionally, operate as function generators, that is, they may have non-linear transfer functions. These non-linear transfer functions may be so set that additional parameters are considered. For example, the respective values of resistor 57 and capacitor 58 of the demodulator 45 (FIG. 3), besides having filtering effects, may be so adjusted that the transfer funtion also compensates for inherent non-linearities of the transducers with which the demodulators are associated, or additional operating parameters of the associated engine components which are reflected by sensed changes by the transducers. For example, the pressures sensed by the transducers 38, 39 may be non-linear with respect to the theoretical pressures, due to internal friction in the engine, in the hydraulic machines, and in the hydraulic transmission. The demodulators 78, 81, connected to the respective transducers 38, 39 can be so designed that non-linearities of transduced signals are compensated. Likewise, the demodulator 72 can be so designed that an output signal is derived therefrom which additionally reflects changes in friction in the engine 21, as the speed of the engine changes.

The system of the present invention not only is useful in providing for optimum torque transfer of the transmision, but also for optimum overall performance of the engine-transmission power system. Thus, the amount of fuel to be supplied by the injection pump 22 to engine 21 can be set with respect to various operating parameters, as derived from signals readily available in the engine system. FIG. 17 illustrates, in fragmentary form, control of the engine 21 for minimum fuel consumption under predetermined loading. The circuit of FIG. 17 is identical to that of FIG. 2, with the addition of four input signals to controller 48, and only the specific change will be described.

Controller 48 has four signals applied. One input to controller 48 is a speed signal $n_1$, derived from engine speed sensor, tachometer generator 33. A second signal is a signal representative of engine output torque (which, in other words, is the torque supplied to the input of the transmission 32, 37, neglecting losses in the gear box 29) which, in turn, is the product of a signal representative of pump displacement derived from pump displacement sensor 103 and the output from the extreme value circuit 84, being the maximum pressure signal arising in the transmission. Yet another signal is the output speed of the transmission, $n_2$, derived from a sensor 133 which is a tachometer generator, similar to tachometer generator 33 and connected to shaft 43, to sense output speed of the transmission. The fourth signal is the output torque derived from the transmission which again is the product of the pressure arising in the hydraulic circuit as sensed by the extreme value circuit 84 and the hydraulic displacement of the hydraulic motor 37, as sensed by a sensor 203 which, in general, is similar to sensor 103, but associated with the motor portion of the hydraulic engine 37, rather than with the compressor portion of the hydraulic engine 32, as is the displacement transducer 103. All these signals are applied to the controller 48, to be there logically combined (for example by a summing circuit in which the respective signals on the respective four lines are weighted, in the light of engine operating characteristics), so that the controller 48 will apply an output signal to injection pump 22 to supply fuel to the engine 21 such that the fuel consumption of the engine 21 will be a minimum in the light of the operating conditions to which the engine is subjected.

We claim:

1. Control system for an internal combustion engine power train to provide drive output power to a load shaft (43) having an internal combustion engine (21) and a variable ratio transmission (32, 37);

fuel injection pump means (48, 22) injecting fuel for use by the internal combustion engine;

an operator controller (25);

means (46, 49) connected to the fuel injection pump and controlled by the operator controller (25) to control the amount of fuel being injected;

a transmission control means (34, 41) connected to the transmission and controlling the transmission ratio thereof;

characterized by a command signal transducer means (26) connected to and controlled by the operator controller (25) and providing an engine command signal;

engine torque transducer means providing a transmission input torque ($M_1$) signal connected to and controlled by the input to the transmission (32, 37);

transmission output torque transducer means providing a transmission output torque ($M_2$) signal connected to and controlled by the output of the transmission (32, 37);

tachometer generator means (33) providing an engine speed ($n_1$) signal and in rotation transmitting relation to the engine;

transmission operating sensing means (103) providing a transmission operation signal and sensing the transmission ratio of the transmission (32, 37);

and a control unit (27) including electrial logical circuit means, connected to and controlled by said command signal transducer means (26), the engine torque transducer means, the transmission output torque transducer means, the tachometer generator means (33) and the transmission operating sensing means (103), and logically combining the signals provided by all said means and providing output signals connected to and controlling the transmission control means (34, 41) to control the transmission ratio in accordance with the signals from all said means, as modified by characteristic transfer functions stored in said control unit, and as logically combined in said control unit.

2. System according to claim 1, wherein the transmission is a hydraulic compressor-motor type transmission having a hydraulic connection circuit (35, 36; 159) connecting the compressor and the motor;

and the transmission operating sensing means comprises a displacement sensor (103) coupled to the hydraulic transmission and providing a displacement output signal representative of the displacement of hydraulic fluid during operation of said transmission.

3. System according to claim 2, wherein the high pressure in the hydraulic circuit (35, 36, 159) and hence the output torque ($M_2$) of the transmission is essentially proportional to the position ($\alpha$) of the operator controller.

4. System according to claim 3, wherein a maximum upper limit for high pressure ($p_{1max}$; $p_{2max}$) in the hydraulic circuit (35, 36, 159) is established;

a maximum torque ($M_{1max}$) for the engine torque ($M_1$) applied to the transmission is established, said maximum limits being represented as limiting parameters in the electrical circuit means of the control unit (27), and the control unit controls the compressor (32) of the transmission to have a displacement such that the first of the operating parameters which reaches the maximum limit is not exceeded, so that the first maximum operating parameter is controlling for the output speed ($n_2$) of the transmission.

5. System according to claim 1, wherein a signal representative of output speed ($n_2$) of the transmission is derived;

and wherein the electrical circuit means of the control unit (27) logically combines the signals applied thereto such that the fuel consumption of the engine (21) is a minimum by logically combining the signals characterizing operation of the transmission as follows: the transmission output torque ($M_2$) signal; the transmission output speed ($n_2$) signal; the transmission input torque ($M_1$) signal; the the transmission input speed ($n_1$) signal.

6. System according to claim 1, wherein the command signal transducer means comprises an inductive position transducer (FIG. 3: 26) having a movable core (52) coupled to the operator controller (25).

7. System according to claim 6, wherein the inductive position transducer comprises a coil (51) coupled to the core (52), the impedance of the coil being varied by changing the position of the core (52) with respect to the coil as a function of movement of the operator controller (25).

8. System according to claim 2, wherein at least one of the torque transducer means includes a pressure transducer (38, 39) and providing a pressure signal sensing pressure in the transmission;

and a multiplier (105) multiplicatively combining the pressure signal and the displacement signal.

9. System according to claim 8, wherein (FIG. 15) at least one of the pressure transducers comprises a piston (155) and a spring (156) loading the piston, the piston being subjected to the pressure in the hydraulic transmission and moving against the force of the spring;

and an inductive position transducer including a coil element (51) and a core element (52), said elements being relatively movable, and one of said elements being coupled to the piston and changing the inductive impedance of the coil in response to movement of the piston.

10. System according to claim 8, wherein a pressure transducer (38, 39), each, is included in the high pressure side and in the low pressure side of the hydraulic transmission and providing a high pressure and a low pressure signal, respectively, both said signals being connected to the multiplier (105).

11. System according to claim 1, wherein the tachometer generator comprises (FIG. 10) a permanent magnet star wheel (75) rotating in synchronism with the engine; and
    a coil (77) electromagnetically coupled to the star wheel to provide a speed output signal representative of speed of the engine.

12. System according to claim 2, wherein (FIG. 16) the displacement sensor (103) comprises an inductive position transducer having a coil element (51) and a core element (52), said elements being relatively movable, one of said elements being coupled to one of the: hydraulic compressor, hydraulic motor; and providing an output upon change of displacement of said compressor, or motor, respectively.

13. System according to claim 12, wherein (FIG. 16) at least one of: motor; compressor; comprises
    a swash plate, or wobble plate (114, 161) type hydraulic machine, and said one element of the position transducer is coupled to the swash plate, or wobble plate, and changes position upon change of inclination of the swash plate or wobble plate of the hydraulic machine.

14. System according to claim 2, wherein (FIG. 8) the transmission control means comprises magnetically operated valves (34a, 34b; 41), applying hydraulic pressure to a hydraulically operated positioning element acting on said compressor (32) and motor (37), respectively, to control operation thereof and, upon change in position, changing the operation of the respective motor, or compressor by changing the flow rate, and pressure of hydraulic fluid in the respective motor, or compressor.

15. System according to claim 1, wherein at least one of the transducer means (FIG. 3) comprises an inductive position transducer having a coil element (51) and a core element (52), said elements being relatively movable with respect to each other, said coil element (51) being connected as a differential inductance;
    and an oscillator (47) connected to supply a-c power to the differential inductance coil.

16. System according to claim 1, wherein the fuel injection pump control means comprises (FIG. 2) first function generator means (46) connected to the command signal transducer (26) and providing a first modified command signal, said first modified command signal being applied to the fuel injection pump to control fuel supply to the engine, and hence engine speed, in accordance with the position of the operator controller (25) as modified by the transfer function of the function generator means;
    characterized in that
        the input torque transducer means comprises (2a) and second function generator (62) connected to the command signal transducer means (26) and providing a second modified command signal, said second modified command signal being applied as an input command signal to the transmission control means to control the input torque ($M_1$) to the transmission.

17. System according to claim 1, wherein the fuel injection pump control means comprises (FIG. 2) first function generator means (46) connected to the command signal transducer (26) and providing a first modified command signal, said first modified command signal being applied to the fuel injection pump to control fuel supply to the engine, and hence engine speed, in accordance with the position of the operator controller (25) as modified by the transfer function of the function generator means;
    characterized in that
        the input torque transducer means comprises (2b) a second function generator (62) connected to the tachometer generator means (33, 72) and providing a second modified speed command signal, the modified speed command signal being applied as an input command signal to the transmission control means (34, 41) to control the input torque ($M_1$) of the transmission.

18. System according to claim 1, wherein the fuel injection pump control means comprises (FIG. 2) first function generator means (46) connected to the command signal transducer (26) and providing a first modified command signal, said first modified command signal being applied to the fuel injection pump to control fuel supply to the engine, and hence engine speed, in accordance with the position of the operator controller (25) as modified by the transfer function of the function generator means;
    characterized in that
        the input torque transducer means comprises (2c) and second function generator (62) connected to the command signal transducer means (26) and providing a second modified command signal;
    a null, or center shift circuit (73) is provided having the second modified command signal applied thereto and being connected to and controlled by the tachometer generator means (33, 72) and shifting the second modified command signal in a direction to reduce its valve at low engine speeds ($n_1$), the second modified command signal, as additionally affected by the center shift circuit being applied as an input command signal to the transmission control means (34, 41) to control the input torque ($M_1$) of the transmission.

19. System according to claim 2, wherein a maximum upper limit for high pressure ($p_{1max}$; $p_{2max}$) in the hydraulic circuit (34, 36, 159) is established,
further characterized in that
an extreme value circuit (84) is provided;
pressure transducer means (38, 39) are provided, connected to sense pressure in the hydraulic transmission and having the output from the pressure transducer means applied to the extreme valve circuit to obtain a signal representative of maximum pressure in the transmission, and forming an actual operating pressure signal;
and wherein the control unit (27) includes a pressure limit circuit (86; FIGS. 5a, 5b);
a third function generator (91) connected to the command signal transducer (26) and providing a third modified command signal, said third modified command signal being applied to the pressure limiting circuit as a command signal, and the actual operating pressure signal as an actual signal, and providing an output to the transmission control means (34, 41) to control the pressure therein in accordance with commanded limited pressure.

20. System according to claim 19, further comprising a preference circuit (85) providing for preferential signal transmission of rapid changes in signal level and connected between the extreme value circuit (84) and the pressure limiting circuit (86).

21. System according to claim 19, further comprising signal modification circuit means (95, 96) connected to the pressure limiting circuit (86) to modify the effect of the third modified command signal derived from the third function generator (91) on the output signal from the pressure limiting circuit (86).

22. System according to claim 21, further comprising an auxiliary operator controller (92), and signal transducer means (93) coupled to the auxiliary controller to provide an auxiliary control signal representative of the position of the auxiliary controller (92);
and wherein the signal modification circuit means comprises a fourth function generator (95; 5b) connected to receive the auxiliary commang signal and connected to and controlling the limit values of the pressure limiting circuit (86).

23. System according to claim 21, wherein the signal modification circuit means comprises a fifth function generator (96) connected to the tachometer generator (33) to receive the speed signal and providing a modified speed signal, the fifth function generator (96) being connected (5c) to the pressure limiter circuit (86) to modify the pressure limit setting thereof.

24. System according to claim 2, wherein (FIG. 13) the engine torque transducer means comprises pressure transducer means (38, 39) hydraulically coupled to the hydraulic transmission (32, 37) and providing a pressure signal representative of the pressure at the high pressure level in the transmission; and
a multiplier (105) connected to receive said pressure signal and a displacement signal from the displacement sensor (103) and multiplying said pressure and said displacement signals and providing an output signal which is representative of the actual torque ($M_1$) applied by the engine (21) to the transmission (32, 37).

25. System according to claim 24, wherein the multiplier (105) comprises a voltage-frequency converter (137) having one input to the multiplier connected thereto;
a monostable flip-flop (138) connected to the converter (137) and providing output pulses having a pulse repetition rate representative of frequency of the converter;
a pule energy modulator (139) having a control input connected to the other input to the multipler and connected to receive the pulses from the flip-flop (138) and controlling at least one of: pulse width; pulse amplitude, in accordance with the signal applied to the control input;
and a demodulator (139) connected to demodulate the pulses delivered from the pulse modulator (139).

26. System according to claim 4, wherein the operator controller (25) includes means (26, 45; 46, 48, 22, 21, 33, 72) providing an operator command signal commanding a predetermined engine performance;
the electrical circuit means comprises a combining circuit (63) having applied thereto the transmission input torque ($M_1$) signal representative of actual delivered engine torque;
the operator command signal representing commanded torque;
and a signal representative of maximum permissible pressure ($p_{1max}$, $p_{2max}$) in the hydraulic transmission;
the combining circuit (63) combining the actual and commanded torque signals and providing an output signal to the transmission control means (34, 41) to null any difference between said signals, as limited by the maximum pressure signal.

27. System according to claim 26, wherein (FIG. 6) the combining circuit (63) comprises a comparator-type control circuit including an adding stage (106) having positive adding and negative subtracting inputs;
an operational amplifier (107) connected to the output of the adding stage (106), the signals representing actual and commanded torque being applied to oppositely polarized inputs of the adding stage, and the maximum pressure signal providing a maximum limit for the signal representing commanded torque to limit the resulting different signal to a value such that the maximum pressure levels in the hydraulic transmission (32, 37) will not be exceeded.

28. System according to claim 26, wherein the electrical circuit means further comprises a dead band circuit (64) connected between the output of the combining circuit (63) and the transmission control means (34, 41) and providing a dead band in the signals, in which dead band the signals from the combining circuit to the transmission control means are suppressed.

29. System according to claim 28, wherein the dead band circuit (64) comprises
a pair of trigger circuits (65, 66), one of which determines the lower limit of the dead band and the other the upper limit of the dead band, said trigger circuits further transferring the signals derived from the combining circuit (63) into two digital signals having control effects; increased transmission torque - OFF; decreased transmission torque - OFF,
the OFF position of both said signals occurring when the signals from the combining circuit fall in the dead band zone of the dead band circuit (64).

30. System according to claim 28, wherein the system comprises (FIG. 2) a vehicle direction selector control (28) and a switching circuit (67) connected to and controlled by the selector control (28);
the transmission control means (34, 41) comprising electrically controlled valves (34a, 34b; 41) respectively controlling the direction of operation of the transmission (32, 37), the switching circuit connecting the signals from the dead band circuit (64) with respective polarity to the electrically controlled valves (34a, 34b; 41) as commanded by the direction selector control (28).

31. System according to claim 30, wherein (FIG. 14) the switching circuit (67) includes change-over switch means (143, 144, 145, 146, 151) comprising
at least two change-over switches (143, 144) and a logic circuit including first and second AND-gates (147, 148), the outputs of the AND-gates forming the outputs from the switching circuit (67);
and the selector control has three positions comprising DRIVE (D); NEUTRAL (N); REVERSE (R);
wherein, when the selector control is in the DRIVE position,
the first change-over switch (143) connects one output of the dead band circuit (64) with one input of the first AND-gate (147) and the second change-over switch (144) connects the second output of the dead band circuit (64) with the first input of the second AND-gate (148);
when the selector control is in REVERSE position,
the first change-over switch (143) connects the second output of the dead band circuit (164) to the first input of the first AND-gate (147) and the second change-over switch (144) connects the first output of the dead band circuit (64) to the first input of the second AND-gate (148);

and, when the selector control is in NEUTRAL position,
connection from both the outputs of the dead band circuit (64) and the outputs from the switching circuit is interrupted.

32. System according to claim 31, wherein the change-over switch means comprises third and fourth change-over switches (145, 146) and the logic circuit includes first and second OR-gates (152, 153);

the output of the first AND-gate (147) being connected to one input of the first OR-gate (152), whereby the output of the OR-gate will form one output of the switching circuit, for connection to the transmission control means; the output of the second AND-gate (148) being connected to one input of the second OR-gate (152), the output of the second OR-gate forming another output of the switching circuit for connection to the transmission control means;

and wherein a constant voltage source (68) is provided, the selector control means, when in the NEUTRAL position, connecting the constant voltage source (68) to a second input of the first OR-gate (152) by the third transfer switch (145) and a second input of the second OR-gate (153) to the source (168) by the fourth transfer switch (146).

33. System according to claim 30, wherein the switching circuit (67) includes logic gates (147, 148);

the control unit (27) further comprises a vehicle operating mode sensing unit (79) including a logic circuit (FIG. 7: 80, 82, 83, 90), said logic circuit having a signal applied thereto representative of torque transmitted by the transmission (32, 37) and providing a logic output signal to the logic gates (147, 148) of the switching circuit (67) to permit selective energization of the logic gates therein, and hence transfer signals from the combining circuit (63) to the transmission control means (34, 41) only if the torque transmitted by the transmission is in accordance with the switched position of the switching circuit as determined by the selector control (28).

34. System according to claim 33, wherein the hydraulic transmission (32, 37) comprises reversibly operating hydraulic machines, operable as a motor, and as a compressor, or pump, respectively, the hydraulic connection circuit having high and low pressures arising therein in accordance with the mode of operation of the respective machines;

wherein the vehicle operating mode sensing unit (79) includes a comparator (80) connected to and controlled by the pressures arising in the hydraulic connection circuit, and providing an output signal having a polarity representative of respective high and low pressure relationships arising in said hydraulic connection circuit, and hence representative of the mode of operation of the respective machines.

35. System according to claim 34, wherein the logic circuit of the vehicle operating mode sensing unit (79) comprises (FIG. 7) an OR-gate (82), and first and second NAND-gates (83, 90);

and wherein the output of the comparator (80) is connected to one input of the OR-gate (82) and one input of the NAND-gate (83);

the output signals of the OR-gate (82) and of the NAND-gate (83) are connected to the inputs of the second NAND-gate (90);

the output signal of the second NAND-gate (90) forming an output of the vehicle operating mode sensing unit (79) and being connected to said switching circuit (67);

and wherein the switching circuit (67) includes a connecting line connected to the second input of the OR-gate (82) and to the second input of the first NAND-gate (83) of the vehicle operating mode sensing unit (79).

36. System according to claim 35, wherein the switching circuit (67) includes first, second, third, fourth and fifth change-over switches (143, 144, 145, 146, 151);

a logic circuit including first (147), second (148), third (149) and fourth (150) AND-gates, and first (152) and second (153) output OR-gates, the first, second, third and fourth AND-gates (147-150) being logically connected to respective OR-gates (152, 153), the outputs of the OR-gates (152, 153) forming the output of the switching circuit (67) and being connected to the transmission control means (34, 41);

and wherein a first input of the third AND-gate (149) is connected to the first input of the first AND-gate (147);

a first input of the fourth AND-gate (150) being connected to the first input of the second AND-gate (148);

the output of the third AND-gate (149) being connected to a third input of the second OR-gate (153);

the output of the fourth AND-gate (150) being connected to a third input of the first OR-gate (152);

a source of constant volage (68) is provided, the fifth change-over switch (151) being controlled by the selector control (28) and connecting the inputs to the OR-gate (82) and the first NAND-gate (83) of the vehicle operating mode sensing unit to ground, or chassis potential when the selector control (28) is in NEUTRAL (N) and REVERSE (R) position, while connecting said OR-gate (82) and first NAND-gate (83) to the source of voltage (68) when the selector (28) and hence the fifth transfer switch (51) is in DRIVE (D) position;

the output of the second NAND-gate (90) of the vehicle operating mode sensing circuit (79) being connected to a second input of the first AND-gate (147), and a second input of the second AND-gate (148) and to an inverting second input of the fourth AND-gate (150).

37. System according to claim 19, further comprising an auxiliary power shaft (31) mechanically coupled to the engine (21), the tachometer generator means providing an engine speed signal ($n_1$), providing said signal also as a representation of the speed of said auxiliary power shaft (31);

and wherein the pressure limit circuit (86) has a signal applied thereto representative of engine speed and controlling the output to the transmission control means independently of output speed from the transmission (FIG. 2: 5c).

* * * * *

UNITED STATES PATENT AND TRADEMARK OFFICE
CERTIFICATE OF CORRECTION

PATENT NO. : 3,927,528
DATED : December 23, 1975
INVENTOR(S) : VAN DER KOLK et al It is certified that error appears in the above-identified patent and that said Letters Patent are hereby corrected as shown below:

Delete line 30 "foreign application priority data, August 13, 1973, Germany, 2340841"

Signed and Sealed this sixteenth Day of March 1976

[SEAL]

Attest:

RUTH C. MASON
*Attesting Officer*

C. MARSHALL DANN
*Commissioner of Patents and Trademarks*